US012005559B2

(12) United States Patent
Lautenschläger et al.

(10) Patent No.: US 12,005,559 B2
(45) Date of Patent: Jun. 11, 2024

(54) ATTACHMENT AND PORTABLE POWER TOOL HAVING AN ATTACHMENT

(71) Applicant: Festool GbmH, Wendlingen (DE)

(72) Inventors: Alexander Lautenschläger, Esslingen (DE); Peter Seiler, Dornstadt (DE); Benno Gmünder, Pfäffikon (CH); Stefan Ziegler, Siebnen (CH)

(73) Assignee: FESTOOL GMBH, Wendlingen (DE)

( * ) Notice: Subject to any disclaimer, the term of this patent is extended or adjusted under 35 U.S.C. 154(b) by 408 days.

(21) Appl. No.: 17/610,017

(22) PCT Filed: May 8, 2020

(86) PCT No.: PCT/EP2020/062927
§ 371 (c)(1),
(2) Date: Nov. 9, 2021

(87) PCT Pub. No.: WO2020/229363
PCT Pub. Date: Nov. 19, 2020

(65) Prior Publication Data

US 2022/0193875 A1 Jun. 23, 2022

(30) Foreign Application Priority Data

May 10, 2019 (DE) ......................... 102019112260.0
May 20, 2019 (DE) ......................... 102019113212.6

(51) Int. Cl.
*B25F 3/00* (2006.01)
*B25B 21/00* (2006.01)
*B25B 23/00* (2006.01)

(52) U.S. Cl.
CPC .............. *B25F 3/00* (2013.01); *B25B 21/007* (2013.01); *B25B 23/0028* (2013.01)

(58) Field of Classification Search
CPC .... B25F 3/00; B25F 5/02; B25F 5/001; B25B 23/0028; B25B 21/007
(Continued)

(56) References Cited

U.S. PATENT DOCUMENTS 9,751,176 B2 * 9/2017 McRoberts ............... B25F 5/02
9,956,676 B2 * 5/2018 Wong ...................... B24B 23/04
(Continued)

FOREIGN PATENT DOCUMENTS

DE 102014207713 A1 10/2015
DE 102014224591 A1 11/2015
(Continued)

OTHER PUBLICATIONS

European Examination Report dated Apr. 25, 2023.

*Primary Examiner* — Alentin Neacsu
(74) *Attorney, Agent, or Firm* — Hoffmann & Baron, LLP

(57) ABSTRACT

An attachment for a portable power tool, in particular a screwdriver machine or drilling machine, wherein the attachment has a drive part with a drive element and an output part with an output element for driving a work tool, wherein the drive element is able to be coupled to a machine output element of the portable power tool in order to drive the attachment and is connected or coupled to the output element via a transmission for driving the output element, and wherein the drive part has, on a drive side, a fastening device for releasably fastening the attachment to the portable power tool for conjoint rotation with respect to an angle positioning axis. Provision is made for the output part to be rotatable about the angle positioning axis relative to the drive part into at least two mutually different angle positions.

28 Claims, 9 Drawing Sheets

(58) Field of Classification Search
USPC .......................................... 173/29, 213, 164
See application file for complete search history.

(56) References Cited

U.S. PATENT DOCUMENTS

| | | | | |
|---|---|---|---|---|
| 10,576,593 | B2 * | 3/2020 | McRoberts | B25F 5/02 |
| 2015/0343583 | A1 * | 12/2015 | McRoberts | B23Q 5/045<br>173/213 |
| 2022/0193875 | A1 * | 6/2022 | Lautenschläger | B25F 3/00 |

FOREIGN PATENT DOCUMENTS

| | | | |
|---|---|---|---|
| DE | 102015200831 | A1 | 7/2016 |
| DE | 102016202831 | A1 | 8/2016 |
| EP | 2383076 | A1 | 11/2011 |
| EP | 2745992 | A2 | 6/2014 |
| EP | 2942159 | A1 | 11/2015 |
| EP | 2 949 431 | A1 | 12/2015 |

* cited by examiner

ATTACHMENT AND PORTABLE POWER TOOL HAVING AN ATTACHMENT

This application is a National Stage application based on International Application No. PCT/EP2020/062927, filed May 8, 2020, which claims priority to DE 102019112260.0, filed May 10, 2019, and DE 102019113212.6, filed May 20, 2019, a.

BACKGROUND OF THE INVENTION

The invention relates to an attachment for a portable power tool, in particular a screwdriver machine or drilling machine, wherein the attachment has a drive part with a drive element and an output part with an output element for driving a work tool, wherein the drive element is able to be coupled to a machine output element of the portable power tool in order to drive the attachment and is connected or coupled to the output element via a transmission for driving the output element, and wherein the drive part has, on a drive side, a fastening device for releasably fastening the attachment to the portable power tool for conjoint rotation with respect to an angle positioning axis.

Such an attachment is described, for example, in EP 2 383 076 A2. The attachment is a so-called angle attachment, in which the drive element and the output element rotate about axes of rotation at an angle to one another and are coupled to one another via an angle transmission. To change the axis of rotation of the output element relative to the machine axis of rotation or drive axis of rotation, the attachment is released somewhat from the portable power tool and fixed again on the portable power tool in a different angle position. However, the handling is somewhat cumbersome.

SUMMARY OF THE INVENTION

It is therefore the object of the present invention to provide an improved attachment.

To achieve the object, it is provided in an attachment of the type mentioned at the outset that the output part is rotatable about the angle positioning axis relative to the drive part into at least two mutually different angle positions and each angle position is fixable by way of an angle fixing device that has a drive angle fixing body and an output angle fixing body, wherein at least one of the angle fixing bodies is adjustable along an adjustment path relative to the other angle fixing body by an actuating element of an actuating device of the attachment between an angle fixing position, in which the angle fixing bodies fix the output part with respect to the drive part for conjoint rotation, and an angle adjustment position, in which the angle fixing bodies release the output part for rotation about the angle positioning axis with respect to the drive part.

The drive angle fixing body is, for example, arranged for conjoint rotation on the drive part with respect to the angle positioning axis and/or assigned to the drive part. The output angle fixing body is preferably arranged for conjoint rotation on the output part and/or assigned to the output part.

In the angle fixing position, the angle fixing bodies are preferably in formfitting engagement with one another. In the angle adjustment position, the angle fixing bodies are preferably disengaged. It is advantageous if, in the angle adjustment position the one angle fixing body is movable relative to the other angle fixing body and/or the angle fixing bodies are movable relative to one another. The one angle fixing body preferably enables and/or permits a relative movement of the other angle fixing body in the angle adjustment position.

The adjustment path, along which at least one or both angle fixing bodies are movable relative to one another, can extend in different directions. For example, the adjustment path extends radially with respect to the angle positioning axis. Thus, for example, an angle fixing body, in particular the output angle fixing body can be adjustable radially with respect to the angle positioning axis in relation to the other angle fixing body, for example the drive angle fixing body, thus, for example, from radially outward to radially inward with respect to the angle positioning axis or the like. It is also possible that the adjustment path extends transversely to the angle positioning axis. Furthermore, a circular path or curved path is possible as the adjustment path. It can thus be provided, for example, that the adjustment path extends in an arced and/or circle shape about the angle positioning axis.

The drive angle fixing body can be arranged on the drive part for conjoint rotation with respect to the angle positioning axis. However, it is also possible that the drive angle fixing body can be brought with respect to the drive part into a position for conjoint rotation with respect to the angle positioning axis. For example, it is possible that the drive angle fixing body is adjustable between a position for conjoint rotation with respect to the angle positioning axis and a position rotatable with respect to the angle positioning axis. The actuating device can be used for this purpose, for example. In particular, it is advantageously provided that the drive angle fixing body is mounted adjustably on the attachment, in particular an attachment housing thereof, with respect to the angle positioning axis between a position connected to the portable power tool for conjoint rotation and a position rotatable with respect to the portable power tool. The drive angle fixing body is advantageously mounted on the attachment or its attachment housing or with respect to the attachment of the attachment housing so it is linearly displaceable between the two above-mentioned positions.

A portable power tool having such an attachment is also provided to achieve the object.

The invention advantageously also relates to an attachment for a portable power tool, in particular a screwdriver machine or drilling machine, wherein the attachment has a drive part with a drive element and an output part with an output element for driving a work tool, wherein the drive element is able to be coupled to a machine output element of the portable power tool to drive the attachment and is connected or coupled to the output element via a transmission to drive the output element, and wherein the drive part has, on a drive side, a fastening device for releasably fastening the attachment to the portable power tool, and wherein the output part is rotatable about the angle positioning axis relative to the drive part into at least two mutually different angle positions and the respective angle position is fixable by way of an angle fixing device that has a drive angle fixing body that is arranged for conjoint rotation with respect to the angle positioning axis on the drive part and/or an output angle fixing body assigned to the output part, which are in formfitting engagement with one another in an angle fixing position and fix the output part for conjoint rotation with respect to the drive part and are disengaged in an angle adjustment position and the output part is released for a rotation about the angle positioning axis with respect to the drive part, wherein at least one of the angle fixing bodies is movably mounted relative to the other angle fixing body, in particular radially to the angle positioning axis, between the angle fixing position and the angle adjustment position and is adjustable by an actuating element of an actuating device of the attachment between the angle adjustment position and the angle fixing position.

It is a basic concept that the attachment has a drive part and an output part, wherein the drive part is pivotable or rotatable relative to the drive part about the angle positioning axis to change an orientation of the axis of rotation of the output element relative to the axis of rotation of the drive element, for example, to move it into other angle positions (for example in the case of an angle attachment) or into another parallel orientation (for example in the case of an eccentric attachment). The fixing or locking with respect to the angle positioning axis takes place in a reliable and simple manner, namely with the aid of the at least one angle fixing body which is, for example, radially adjustable or rotatable, or the multiple adjustable angle fixing bodies, the actuation of which is possible with the aid of the actuating element.

The relative adjustment of the angle fixing body with respect to the angle positioning axis, which runs, for example, transversely to the angle positioning axis and is radial or arced around the angle positioning axis, for example, advantageously enables the support of higher torques about the angle positioning axis.

The output part is preferably exclusively rotatable or pivotable about the angle positioning axis with respect to the drive part. The angle positioning axis is preferably a single or individual axis about which the output part is pivotable or rotatable relative to the drive part.

The angle positioning axis is preferably coaxial with an axis of rotation of the drive element and/or with a machine axis of rotation of the machine output element when the attachment is fastened on the portable power tool.

The attachment is, for example, a so-called eccentric attachment, i.e., the axes of rotation of the drive element and the output element are parallel to one another but eccentric.

Furthermore, it is advantageous that the attachment is an angle attachment, i.e., the axes of rotation of drive element and output element are at an angle to one another, in particular at a right angle to one another. Other angle positions or angle orientations are possible.

Furthermore, it is advantageous if the transmission between drive element and output element does not have a speed-changing or torque-changing property, i.e., the speeds and/or the torques of drive element and output element are identical. The transmission between drive element and output element can also be a step-up transmission or step-down transmission, however, i.e., the transmission of the attachment decreases or increases the speed of the drive element in relation to the output element. In principle, a shift transmission would also be conceivable, i.e., different transmission ratios can be shifted between drive element and output element.

The fastening device and/or the angle fixing device has rotation lock contours, in particular a rotation lock body having rotation lock contours, on the drive side for rotation locked holding of the attachment with respect to the angle positioning axis on the portable power tool, in particular its machine housing, to engage in counter rotation lock contours of the portable power tool or the drive part of the attachment. The rotation lock contours are advantageously provided for end face or frontal engagement in the counter rotation lock contours. The counter rotation lock contours are provided, for example, on a front face or end face of the portable power tool, on which the machine output element is arranged. However, it is also possible that the counter rotation lock contours are arranged fixed in place with respect to the drive part of the attachment. For example, the counter rotation lock contours can be arranged in a housing or an interior of the housing of the attachment. The rotation lock contours preferably extend in a ring shape or partial ring shape around the drive element. It is also advantageous if the counter rotation lock contours extend in a ring shape or partial ring shape around the machine output element. The rotation lock contours and/or counter rotation lock contours comprise, for example, teeth or gear teeth. It is obvious that other pairs complementary to one another and/or matching one another in a formfitting manner of at least one formfitting projection and a formfitting receptacle matching thereto are also readily suitable as the rotation lock contour and counter rotation lock contour. It is obvious that the rotation lock contours can comprise a single rotation lock projection or a single rotation lock receptacle or can be formed thereby. The rotation lock contours are arranged, for example, on the drive angle fixing body. The rotation lock contours can also be arranged on a rotation lock body separate from the drive angle fixing body, however, in particular a rotation lock body of the fastening device.

It is to be noted here that the angle fixing device can form a component of the fastening device, for example to implement the rotation lock with respect to the angle positioning axis on the portable power tool. Furthermore, however, the fastening device and/or a component of the fastening device, for example the rotation lock body, can also be a component of the angle fixing device. However, it is also possible that the fastening device provides a rotation lock of the fixing on the portable power tool with respect to the angle positioning axis independently of the angle fixing device.

It is advantageous if the rotation lock contours can be engaged with the counter rotation lock contours by a plugging movement in a plug direction along a plug axis which is parallel to the angle positioning axis or has a directional component parallel to the angle positioning axis. In particular, it is advantageous if the plug axis is parallel to the machine axis of rotation of the machine output element and/or parallel to the axis of rotation of the drive element of the attachment and/or parallel to the angle positioning axis.

Furthermore, it is advantageous if the angle fixing device for fixing or locking the output part relative to the drive part is adjustable with respect to the angle positioning axis between the angle fixing position and the angle adjustment position when the drive part is or remains connected with the aid of the fastening device to the portable power tool.

Furthermore, it is advantageous if the fastening device for fastening the attachment is provided and/or designed in engagement with a fastening part fixed in place with respect to a machine housing of the portable power tool and/or fixedly arranged on the machine housing.

It is advantageous if the fastening device has a support surface for supporting the attachment on the portable power tool in a plug direction and/or with respect to a plug axis. It is preferred if the support surface is arranged fixed in place on the attachment with respect to the plug direction or plug axis. The rotation lock contour can be fixed in place with respect to the support surface. However, it is also possible that the mentioned rotation lock contour is movable relative to the support surface, in particular is linearly movable.

The plug direction preferably extends in parallel or coaxial to the above-mentioned plug axis and/or to the angle positioning axis and/or to a machine axis of rotation of the machine output element and/or in parallel to the axis of rotation of the drive element of the attachment. The above-mentioned rotation lock contours can be arranged on the support surface. The portable power tool preferably has a support body complementary thereto for supporting the support surface of the fastening device. The counter rotation lock contours of the portable power tool are advantageously arranged on the support body of the portable power tool.

It is preferably provided that the fastening device has, for tension-resistant holding of the attachment on the portable power tool against the plug direction in a fixing position, at least one latch body adjustable between a fixing position and a release position and having at least one locking contour, which is engaged with a counter locking contour of the portable power tool in the fixing position and is disengaged from the counter locking contour in the release position to remove the attachment from the portable power tool.

It is expediently provided that the latch body is a ring body rotatably mounted about the plug axis or angle positioning axis and/or the locking contour is a bayonet contour and/or the latch body is rotatably mounted about an axis of rotation along which the plug direction extends. For example, the latch body is designed as a ring body on which two or more bayonet contours are arranged. The bayonet contours or locking contours have, for example, inclined faces or clamping faces which rise or fall in a ring shape with respect to the axis of rotation.

It is possible that the rotation lock body and the drive angle fixing body are components separate from one another. For example, the rotation lock body can be arranged on a housing of the attachment or can be arranged fixedly or for conjoint rotation, but linearly movable, for example, therein. It is then advantageous that the drive angle fixing body is connected to the rotation lock body for conjoint rotation with respect to the angle positioning axis and/or displacement-fixed in parallel to the angle positioning axis. It is also possible that the drive angle fixing body forms the rotation lock body or is integral therewith.

The rotation lock body can be arranged on the attachment for conjoint rotation and to be displacement-fixed with respect to the angle positioning axis. However, it is also possible that the rotation lock body and/or the drive angle fixing body is mounted on the attachment in particular so it is linearly movable with respect to the angle positioning axis between a rotation lock position and a rotation release position, wherein the rotation lock contours are adjusted in the rotation lock position toward the counter rotation lock contours, in particular engage in the counter rotation lock contours, and are adjusted in the rotational release position away from the counter rotation lock contours, in particular are disengaged from the counter rotation lock contours. For example, the rotation lock contours in the rotation lock position for engaging in the counter rotation lock contours of the portable power tool protrude farther in front of the drive side than in the rotational release position. In particular, the rotation lock body formed by the drive angle fixing body can be movably adjustable in this way between the rotation lock position and the rotational release position. Also and in particular if the rotation lock body is adjustable between the rotational release position and the rotation lock position, it is advantageous if the fastening device is designed, in the event of a displacement or adjustment of the rotation lock body between the rotational release position and the rotation lock position, to hold the attachment fixed in place with respect to the machine housing of the portable power tool.

Furthermore, it is advantageous if the output angle fixing body, in the angle fixing position of the angle fixing device, fixes the rotation lock body formed in particular by the drive angle fixing body fixed in place in the rotation lock position and/or, in the angle adjustment position, releases the rotation lock body for a movement into the rotational release position. The rotational release position corresponds, for example, to the angle adjustment position, and the rotation lock position corresponds to the angle fixing position.

It is advantageously provided that the output angle fixing body is designed for adjusting the rotation lock body from the rotational release position into the rotation lock position. For example, inclined faces or similar other actuating faces can be provided between the output angle fixing body and the rotation lock body.

A dedicated actuating handle can be provided for adjusting the rotation lock body from the rotation lock position into the rotational release position. For example, a gripping element or similar other actuating handle can be connected or movement-coupled to the rotation lock body. However, it is preferred if the actuating element is movement-coupled to the rotation lock body to carry it along into the rotational release position. In this case, the actuating element provides an adjustment of the angle fixing body of the angle fixing device and moreover an adjustment of the rotation lock body.

It is furthermore advantageously provided that a release transmission for adjusting the rotation lock body or angle fixing body from the rotation lock position into the rotational release position is arranged between the actuating element and the rotation lock body and/or an angle fixing body to be actuated. The release transmission comprises, for example, one or multiple inclined faces. The release transmission can act, for example, in the meaning of a force amplification and/or a force redirection, for example a redirection of a rotational actuation of the actuating element into a linear movement of the rotation lock body. The release transmission therefore comprises, for example, a redirection transmission and/or a force-amplifying transmission or the like. It is to be noted once again at this point that the rotation lock body and the drive angle fixing body are preferably integral or fixedly connected to one another.

It is advantageous if the rotation lock body is spring-loaded in the rotation lock position by a spring assembly. The spring assembly comprises, for example, one or multiple springs, in particular coiled springs. The spring assembly preferably acts along a linear axis, along which the rotation lock body is mounted so it is linearly movable on the attachment or its housing. The linear axis preferably corresponds to the plug axis, along which the attachment is pluggable onto the portable power tool.

One preferred concept provides that a clearance is present between the actuating element and the at least one adjustable rotation lock body, which enables an adjustment of the at least one adjustable angle fixing body from the angle fixing position into the angle adjustment position before an adjustment of the rotation lock body from the rotation lock position into the rotational release position. It is thus possible, for example, that the actuating element initially adjusts the output angle fixing body or the output angle fixing bodies from the angle fixing position into the angle adjustment position or releases an adjustment of the output angle fixing body from the angle fixing position into the angle adjustment position. The adjustment of the rotation lock body from the rotation lock position into the rotational release position subsequently can take place or does take place.

The above-mentioned release transmission has a supporting effect, for example, against the force of the spring assembly during the adjustment of the rotation lock body from the rotation lock position into the rotational release position.

The spring assembly forms, for example, a first spring assembly, while a spring assembly also described hereinafter, which is used for actuating the angle fixing device in the angle fixing position and/or acts directly on the actuating element, forms a second spring assembly.

It is possible in principle that the angle fixing device is actuatable manually or by motor from the angle fixing position into the angle adjustment position and vice versa. However, it is advantageous if the attachment has a spring assembly for actuating the angle fixing device in the angle fixing position. The spring assembly comprises, for example, one or multiple coiled springs or torsion springs. In particular, it is advantageous if the spring assembly comprises a spring, in particular a coiled spring or torsion spring, which is penetrated by the angle positioning axis. The spring, for example the torsion spring or the coiled spring, preferably has a diameter which approximately corresponds to the diameter of the actuating element. The angle fixing device more or less reliably has the spring assembly applied to it in the direction of the angle fixing position. A leg spring having one or multiple turns is readily possible, for example, as a torsion spring.

It is possible that the spring assembly acts directly on the drive angle fixing element and/or the output angle fixing element. It is preferred if the spring assembly acts on the actuating element of the actuating device in the direction of an adjustment of the angle fixing device in the angle fixing position.

A variety of options are given in the design of the actuating element. For example, the actuating element can be designed as an actuating slide, actuating lever, actuating ring, or the like. It is advantageous if the actuating element extends in a ring shape or partial ring shape about the angle positioning axis. For example, the actuating element is designed as a ring body. In particular, it is advantageous if a ring-shaped or partial ring-shaped latch body of the fastening device and the ring-shaped or partial ring-shaped actuating element are arranged adjacent to one another, in particular directly adjacent to one another with respect to the angle positioning axis and/or the machine axis of rotation of the machine output element and/or the drive element.

Furthermore, it is possible that the actuating device, in particular the actuating element, is driven by motor, for example with the aid of a positioning magnet, positioning motor, or the like. However, a manual concept is preferred. For example, it is advantageous if the actuating element of the actuating device is actuatable manually, in particular exclusively manually.

It is possible in principle that the actuating element acts directly, i.e., without an interconnected transmission, on the angle fixing body which is to be actuated. However, it is advantageous if a transfer transmission, in particular an inclined face transmission and/or a redirection transmission for force redirection of movement directions of the actuating element and the angle fixing body to be actuated is arranged between the angle fixing body to be actuated and the actuating element actuating the angle fixing body. For example, the redirection transmission redirects movement of the actuating element in a first movement direction, in particular a rotational movement of the actuating element, into movement of the actuated angle fixing body in a second movement direction, in particular into a linear movement. The transfer transmission can redirect a force direction and/or amplify a force of the actuating element, for example. The transfer transmission can be or comprise, for example, a release transmission for adjusting the angle fixing device from the angle fixing position into the angle adjustment position. The transfer transmission can also be or comprise a fixing transmission for adjusting the angle fixing device from the angle adjustment position into the angle fixing position.

The attachment preferably has an attachment housing.

The actuating element is movably mounted, for example, relative to the attachment housing and/or to the drive part and/or to the drive part, for example, mounted so it is linearly displaceable and/or rotatable.

It is possible that the actuating element is actuatable with at least one directional component radially to the angle positioning axis, for example exactly radially to the angle positioning axis. It is preferred if the actuating element is mounted transversely, in particular perpendicularly transversely to the angle fixing body to be actuated on the attachment or the attachment housing of the attachment or the drive part or the output part. A transversely movable mounting can be or comprise, for example, a slide mounting and/or a rotational mounting, in particular a rotational mounting about the angle positioning axis. Furthermore, it is advantageous if the actuating element is mounted linearly with respect to the attachment and/or its attachment housing. Furthermore, mounting the actuating element in parallel to the angle positioning axis on the attachment or the attachment housing is advantageous. Furthermore, it is possible that the actuating element is rotatably mounted on the attachment or its attachment housing, for example rotatably about the angle positioning axis.

It is advantageous if the actuating element is rotatably mounted about the angle positioning axis, for example rotatably with respect to the drive part. In particular in this embodiment, it is advantageous if the actuating element has at least one positive rotation contour for the positive rotation of the output part about the angle positioning axis. The output part has at least one positive rotation counter contour for the positive rotation contour. Multiple positive rotation contours and positive rotation counter contours which have, for example, angular intervals with respect to the angle positioning axis and/or are arranged in a ring shape with respect to the angle positioning axis, are preferred. The at least one positive rotation contour can be designed, for example, as a rotation stop, which strikes against the at least one positive rotation counter contour. The at least one positive rotation counter contour has, for example, a positive rotation counter contour which is arranged on the housing part of the output part of the attachment housing. The at least one positive rotation counter contour can also comprise or have a positive rotation counter contour, which is arranged on a positive rotation body connected for conjoint rotation or rotationally coupled to the output part, for example on the angle fixing body actuatable by the actuating element. For example, this positive rotation body or angle fixing body is arranged on the output part for conjoint rotation with respect to the angle positioning axis or is rotationally coupled to the output part. The positive rotation body or angle fixing body can be movably mounted with respect to the output part in parallel to the angle positioning axis. If the at least one positive rotation contour strikes against the positive rotation body or angle fixing body or its positive rotation counter contour, it carries along the positive rotation body or angle fixing body in the direction of a rotation about the angle positioning axis, which in turn rotates the output part about the angle positioning axis.

It is preferably provided that the actuating element has a rotational clearance for a rotational movement about the angle positioning axis with respect to the output part in such a way that the actuating element is rotatable out of a rotational position assigned to the angle fixing position into a rotational position assigned to the angle adjustment position before the at least one positive rotation contour reaches rotating engagement with the output part. Therefore, the angle fixing is thus initially releasable before the output part is rotated about the angle positioning axis by a further rotation of the actuating element.

It is advantageous if an angle fixing body, which is integral with the actuating element or is directly movement coupled, in particular rotationally coupled thereto, for example the output angle fixing body, has at least one support surface which supports, in particular locks, the angle fixing body actuatable by the actuating element in the angle fixing position. The support surface can also be referred to as a latch surface. It is advantageous if multiple support surfaces are arranged on the angle fixing body, in particular at angular intervals with respect to the angle positioning axis. A counter support surface of the other angle fixing body, for example of the drive angle fixing body, is assigned to each of the support surfaces. The support surface and the assigned counter support surface are preferably orthogonal or approximately orthogonal to the angle positioning axis.

It is advantageous if an angular interval is present between a positive rotation contour of the actuating element and a respective support surface in such a way that the actuating element is rotatable about the angular interval, wherein the support surface is adjustable away from the counter support surface and the angle fixing device is adjustable or adjusted from the angle fixing position into the angle adjustment position before the positive rotation contour reaches rotational engagement with the output part to rotate the output part about the angle positioning axis.

It is preferred if the actuating element has at least two positive rotation contours, between each of which a support surface is provided, in particular with equal angular interval. The actuating element can carry along or rotationally actuate the output part in rotational directions opposite to one another with the aid of the positive rotation contours.

One embodiment can provide that the actuating element is integral with or fixedly connected to at least one angle fixing body, for example the output angle fixing body.

One of the angle fixing bodies is preferably arranged radially inward, and the other radially outward with respect to the angle positioning axis. It is possible that the angle fixing body mounted radially to the angle positioning axis is a radially inner angle fixing body, while the angle fixing body fixed in place radially with respect to the angle positioning axis is arranged radially outward. Furthermore, it is conceivable that both angle fixing bodies, the output angle fixing body and the drive angle fixing body, are adjustable and mounted radially with respect to the angle positioning axis. A concept shown in the drawings is preferred, in which the at least one angle fixing body radially adjustable with respect to the angle positioning axis is arranged radially outward with respect to the other angle fixing body.

One or both of the angle fixing bodies, in particular the radially inner or a radially inner angle fixing body, can be designed, for example, as a sleeve body or can be formed by a sleeve body. One of the angle fixing bodies, for example the sleeve body, is advantageously penetrated by a shaft body, in particular a drive element of the attachment.

Furthermore, it is advantageous if at least one of the angle fixing bodies, in particular the at least one angle fixing body radially adjustable with respect to the angle positioning axis, is or comprises a locking or fixing cone. Instead of a cone, for example, a roller or similar other rolling body would also be suitable as an angle fixing body.

It is expediently provided that at least one of the angle fixing bodies, in particular the or an angle fixing body fixed in place radially with respect to the angle positioning axis, has a spherical cap for accommodating the radially movable angle fixing body.

Fixing or locking of the angle fixing device in the angle fixing position may be readily implemented using a pair consisting of two angle fixing bodies, namely an output angle fixing body and a drive angle fixing body. However, it is preferred if the at least one angle fixing body which is adjustable along the adjustment path, for example, is rotatable about the angle positioning axis or radially movable to the angle positioning axis, forms a component of an assembly of at least two, preferably at least three angle fixing bodies actuatable by the actuating device and in particular arranged in a ring shape about the angle positioning axis, which have angular intervals to one another with respect to the angle positioning axis and are each mounted movably, in particular radially, with respect to the angle positioning axis. The angle fixing bodies can be arranged fixed in place on a holding body. Furthermore, it is possible that an angle fixing body has multiple support faces or angle fixing faces which are arranged in a ring shape in the circumferential direction or at angular intervals about an axis of rotation about which the angle fixing body is rotatable, for example, the angle positioning axis.

It is possible that the drive angle fixing body is the angle fixing body movable radially to the angle positioning axis. One advantageous concept provides, however, that the output angle fixing body is fixed in place radially with respect to the angle positioning axis and the drive angle fixing body comprises the at least one angle fixing body movably mounted along the adjustment path or is formed thereby. For example, this at least one angle fixing body movable along the adjustment path is movable rotatably about the angle positioning axis or radially to the angle positioning axis.

It is advantageous if one of the angle fixing bodies, for example, the drive angle fixing body, has at least one link body, in particular a radial projection, which engages in a guide path or guide link of the other angle fixing body, for example, the output angle fixing body. Multiple link followers or radial projections and associated guide paths or guide lengths, which are arranged, for example, in a ring shape or star shape, are preferred. A support contour and/or latch contour, for example a support surface or latch surface, for supporting or locking the drive angle fixing body in the angle fixing position is preferably provided on a respective guide link or guide path. The link follower supports itself in the angle fixing position on the support contour or latch contour. Furthermore, a respective guide path or guide link advantageously comprises a release contour, for example a release support surface on which the link follower can support itself in the angle adjustment position. A respective guide link or guide path preferably has a positioning bevel, in particular positioning bevels opposite to one another, between the release contour and the support contour or latch contour, on which the link follower slides along during the adjustment between the angle adjustment position and the angle fixing position.

Furthermore, it is advantageous if the drive angle fixing body is mounted so it is linearly displaceable in relation to the drive part, for example, in parallel to the axis of rotation of the drive element and/or in parallel to the angle positioning axis.

BRIEF DESCRIPTION OF THE DRAWINGS

Exemplary embodiments of the invention are explained hereinafter on the basis of the drawings. In the figures.

DETAILED DESCRIPTION

Figure 1:
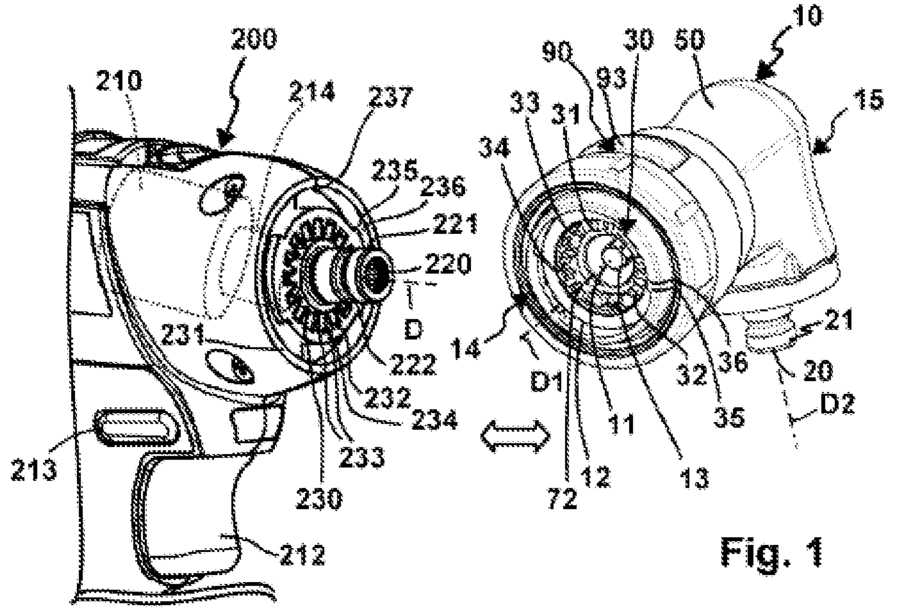
FIG. 1 shows a perspective diagonal view of a system consisting of a portable power tool and an attachment.
Figure 2:
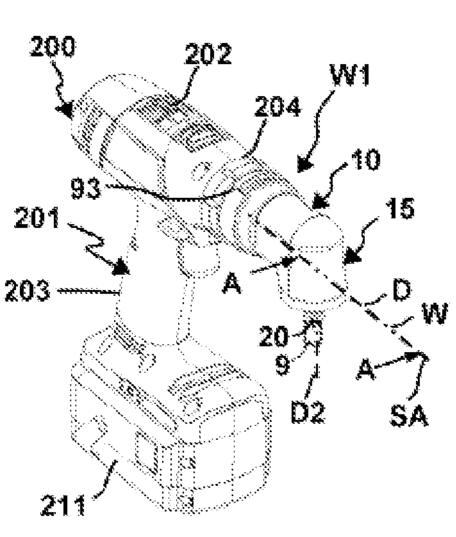
FIG. 2 shows the system according to FIG. 1, wherein the attachment is installed on the portable power tool and has a first angle position with respect to an angle positioning axis.
Figure 3:
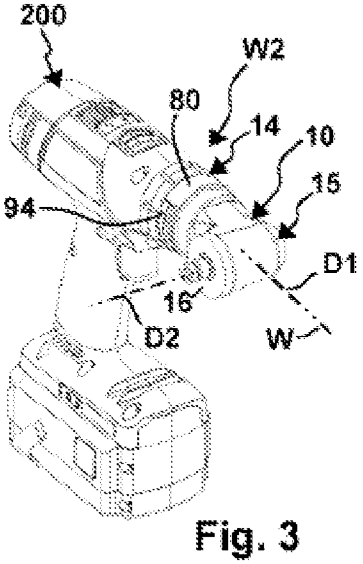
FIG. 3 shows the system according to FIG. 2, wherein the attachment has a second angle position.

A portable power tool 200 for use with attachments 10, 110, 310 comprises a machine housing 201 having a drive section 202, in which a drive motor 210 is arranged. A handle section 203 protrudes from the drive section 202, on which, for example, a switch 212 for actuation by an operator is arranged to switch on the drive motor 210, switch it off, or influence its speed.

Furthermore, an energy accumulator 211, for example a battery pack, is arranged on the handle section 203, using which the drive motor 210 and optionally controlling and/or monitoring components of the portable power tool 200 can be supplied with electrical energy. Alternatively or additionally to the energy accumulator 211, however, a mains cable or similar other supply device can also be provided for supplying the portable power tool 200.

The drive motor 210 drives a tool holder 220 for accommodating a working tool, for example, a screwdriver bit, drill, or the like, directly or via a transmission 214. The tool holder 220 is rotationally drivable by the drive motor 210 about a machine axis of rotation D. A rotational direction of the drive motor 210 is predefinable and changeable with the aid of a rotational direction switch 213.

The tool holder 220 is provided on the front, free end region of a machine output element 221, which protrudes from a neck section of the drive section 202 of the machine housing 201.

The machine output element 221 has a holding depression 222 on its radial outer circumference, which is suitable, for example, as a locking receptacle for a latch element of an attachment. In the present case, however, a support body 230, which is platelike, for example, is provided for fastening the attachments 10, 110, 310 explained hereinafter of the portable power tool 200. The machine output element 221 protrudes from the support body 230.

The support body 230 has a support surface 232 for supporting an attachment on its end face 231. Counter rotation lock contours 233 are advantageously provided on the support surface 232, for example depressions or formfitting receptacles 234, which are used to engage with rotation lock contours of an attachment for the rotation-locked support of the attachment. The formfitting receptacles 234 extend in a star shape around the machine axis of rotation D. It is preferred if the formfitting receptacles 234 have equal angular intervals in relation to one another.

Counter locking contours 235, for example bayonet contours 236, protrude radially outward from the support body 230. A ring-shaped depression 237 extends around the support body 230, so that when an attachment is plugged on or installed, its locking contours are insertable between the counter locking contours 235 into the depression 237 and can be engaged behind the counter locking contours 235, thus the bayonet contours 236, by a rotation about the machine axis of rotation D.

The attachments 10, 110, 310 have drive elements 11 on their drive sides 12, the positive rotation contours 13 of which are or can be engaged with the positive rotation contour 223 of the portable power tool 200 when the attachments 10, 110, 310 are fastened on the portable power tool 200 or are being fastened on the portable power tool 200. The positive rotation contour 13 of the drive element 11 is, for example, polygonal, in particular hexagonal.

The drive elements 11 are rotationally coupled via transmissions 60 to output elements 21. An axis of rotation D1 of the drive element 11 is at an angle to an axis of rotation D2 of the output element 21, for example at a right angle. The transmissions 60 do not provide or effectuate a speech change or torque change, but are solely angle transmissions.

For example, bevel gears 61, which mesh with bevel gears 62 of the transmission 60, are provided on the drive elements 11. In an alternative embodiment (not shown in the drawing), for example, the axes of rotation D1 and D2 are parallel to one another, but are not coaxial. Such an attachment would be, for example, a so-called eccentric attachment.

The drive elements 11 are provided on drive parts 14 of the attachments 10, 110, 310, and the output elements 21 are provided on output parts 15 of the attachments 10, 110, 310. A tool holder 20 for holding and accommodating a working tool 9, for example a screwdriver bit, a drill, or also a holder for a drill, is arranged on an output side 16 of the output part 15 on the respective drive element 21. The tool holder 20 comprises a positive rotation contour 23 on its inner circumference, for example a toothed contour, into which, for example, a screwdriver bit or the like can be inserted. A holding depression 22 is arranged on the radial outer circumference of the output element 20, using which, for example, a drill head or similar other tool holder can be fixed or locked on the attachment 10, 110, 310. The holding depression 23, for example a ring groove, functionally corresponds to the holding depression 222 of the tool holder 220, so that a head having a drill chuck or a clamping chuck, which is arrangeable per se on the machine output element 221 of the attachment, for example, is optionally fastenable on the tool holder 220 or the tool holder 20.

The positive rotation contour 13 is arranged on a free end region of the drive element 11, in particular on a free end region of a shaft section 17 of the drive element 11.

The shaft section 17 is rotatably mounted with the aid of bearings 18, 118, 318 and 19 on an attachment housing 50, 150, 350 or with respect to an attachment housing 50, 150, 350 of the attachment 10, 110, 310.

The bearings 18, 118, 318 and 19 are located on a section 51 of the attachment housing 50, 150, 350 in relation to which a section 52 of the attachment housing 50, 150, 350, on which the output element 21 is rotatably mounted, is angled. The output element 21 is rotatably mounted on the section 52 with the aid of bearings 28, 29.

The output element 21 is rotatably mounted directly on the attachment housing 50, 150, 350 with the aid of the bearing 29. On an end region, the output element 21 has the tool holder 20, on another end region of the output element 21 opposite thereto, the bevel gear 62 and an opening of a receptacle 25, in which a support shaft 26 is accommodated, are provided. The support shaft 26 extends coaxially to the shaft section 24 of the output element 21, thus coaxially to the axis of rotation D2. The support shaft 26 is supported at one end on the output element 21, and at the other end on the bearing 28, which is accommodated in a bearing receptacle 53 of the attachment housing 50, 150, 350.

The bearing 28 is, for example, a plain bearing, while the bearing 29 is a ball bearing.

The bearing 29 is held in a bearing receptacle 54 of the attachment housing 50, 150, 350.

The bearing 29 is located close to the end face or output side 16 of the attachment housing 50, 150, 350.

Furthermore, a cover 59 for closing the housing 50, 150, 350, preferably also for holding the bearing 29, is provided on the output side 16.

The bearing 19 of the attachment 10 is directly supported on the attachment housing 50 on a bearing receptacle 55. In contrast, the bearing 18 is held on a support insert 57, which is accommodated in a receptacle 56 of the attachment housing 50. For example, the bearing receptacle 55 and the receptacle 56 are not only coaxial, but also have the same diameter. The support insert preferably supports or the support insert 57 holds the bearing 19 in the bearing receptacle 55.

In the attachment 110, a support insert 157 is accommodated in a receptacle 56 of the attachment housing 150, on which a bearing receptacle 155 for the bearing 19 is provided. The support insert 157 thus extends up to the bearing 19 and directly up to the bevel gear 61.

Furthermore, a bearing receptacle 156 for rotatably mounting a drive angle fixing body 171 about an angle positioning axis W or about an axis of rotation D1 is provided on the support insert 157.

Furthermore, a bearing receptacle 118 for directly mounting the shaft section 17 of the drive element 21 is provided on the drive angle fixing body 171, i.e., the shaft section 17 is rotatably mounted on the bearing receptacle 118, for example in the manner of a plain bearing. However, a ball bearing like, for example, the ball bearing 18 would also readily be possible there to mount the shaft section 17 rotatably with respect to the attachment housing 50.

The bearings 19, 318 of the attachment 310 are accommodated and held on bearing receptacles 355 and 356 of the section 51 of the attachment housing 350.

Fastening devices 30, 130, 330 are used for fastening the attachments 10, 110, 310 on the portable power tool 200.

The fastening devices 30, 130, 330 comprise rotation lock bodies 31, 131, 331 having rotation lock contours 33 which protrude from a support surface 32. The support surface 32 is used for support on the support surface 232 when the rotation lock contours 33 engage with the counter rotation lock contours 233 by plugging the attachment 10, 110, 310 on the portable power tool 200 along a plug axis SA. The rotation lock contours 34 comprise, for example, formfitting projections 34 which can engage with formfitting receptacles 234 of the counter rotation lock contours 233. Formfitting depressions, in which formfitting projections of the counter rotation lock contours 233 can engage, are between the formfitting projections 34. The rotation lock contours 33, 233 comprise, for example, teeth or gear teeth. When the rotation lock contours 33 are engaged with the counter rotation lock contours 233, the attachments 10, 110, 310 are fastened in a rotation-locked manner on the portable power tool 200 with respect to the plug axis SA.

The plug axis SA is, for example, coaxial with or parallel to the machine axis of rotation D or the axis of rotation D1.

In a plug direction along the plug axis SA, in which the attachment 10, 110, 310 is plugged onto the portable power tool 200, the attachments 10, 110, 310 are supported on one another with the aid of the support surfaces 32, 232.

Against this plug direction, i.e., for a tension-resistant fastening of the attachment 10, 110, 310 with respect to the plug axis SA, locking acts on the portable power tool 200 with the aid of a latch body 37, 137, 337. The latch body 37, 137, 337 has locking contours 35 to engage with the counter locking contours 235. The locking contours 35 comprise, for example, bayonet contours 36 which can be engaged with or disengaged from the bayonet contours 236 by a rotational movement of the latch body 37, 137, 337 about the plug axis SA. The bayonet contours 36 can be inserted past the bayonet contours 236 into the depression 237 of the portable power tool 200 and engaged with the counter bayonet contours 236 in that the latch body 37, 237 is rotated about the plug axis SA. The unlocking accordingly takes place by a rotation of the latch body 37, 137, 337 about the plug axis SA in the opposite rotational direction.

The latch body 37, 137, 337 has a sleeve section 38, on which the locking contours 35 or bayonet contours 36 are arranged.

Positive rotation contours 39 protrude radially outward from the sleeve section 38 of the latch body 37, which are engaged with positive rotation contours 43 of a positive rotation body 42, so that the sleeve section 38 is rotatable about the plug axis SA by a rotation of the positive rotation body 42.

The positive rotation body 42 is in turn held for conjoint rotation on a handle element 46. For example, the handle element 46 is designed as a ring body. Positive rotation contours 44 are advantageously arranged on the radial outside on the positive rotation body 42, which are engaged with positive rotation contours 48 provided on the inner circumference of the handle element 46.

The handle element 46 can also be referred to as an actuating element 46. Gripping contours 47, for example ribs or the like, are provided on the radial outer circumference of the handle element 46, which can be grasped by an operator and are suitable for rotating the handle element 46 and thus the positive rotation body 42.

The latch body 37 is supported on the positive rotation body 42 with the aid of a support body 40, which is arranged in a sandwich between a step 43A of the positive rotation body 42 and the latch body 37. The support body 40 has a step 41, on which the latch body 37 supports itself with a flange section 39A, on which the positive rotation contours 39 are arranged.

The support body 40 and the latch body 37 are held by a holding ring 45, for example, a splint ring, on the positive rotation body 42, which supports itself on the flange section 39A of the latch body 37 and engages in a receptacle 43B of the positive rotation body 42. The receptacle 43B is arranged on the radial inner circumference of the positive rotation body 42, for example, in the manner of a ring groove.

The positive rotation body 42 and thus the latch body 37 are rotatably mounted about the plug axis SA on a guide body 73 of an angle fixing device 70. The guide body 73 is fixedly connected to the output part 15, namely with the aid of screws 88B, which penetrate screw receptacles 88A of the guide body 73 and are screwed into screw receptacles 88 of a further guide body 80.

The guide body 80 is fixedly connected to the attachment housing 50 with the aid of screws 89, which are screwed into the attachment housing 50. The screws 89 are screwed, for example, into screw receptacles 58 on an end face 58A of the section 51 of the attachment housing 50.

For example, the guide body 73 has a flange projection 73A, which protrudes radially outward from a sleeve section 73B. For example, the inner circumference of the positive rotation body 42, which thus also forms a bearing body, is rotatably mounted on the radial outer circumference of the flange projection 73A.

A bearing plate 49 is arranged between the end face 73C of the guide body 73 and the support body 40, so that the support body 40 is rotatably supported on the guide body 73 about the plug axis SA.

The output part 15 is rotatable with respect to the drive part 14 about an angle positioning axis W, which in the present case is coaxial to the axis of rotation D1 or the plug axis SA, so that the axis of rotation D2 can more or less be rotated about the axis of rotation D1 or angle positioning axis W.

In angle positions W1 and W2 shown as examples, the output part 15 is fixable with respect to the drive part 14 with the aid of the angle fixing device 70. Further angle positions in which the angle fixing device 70 fixes the output part 15 with respect to the drive part 14 are possible but are not shown in the drawing.

The angle fixing device 70 comprises drive angle fixing bodies 71 assigned to the drive part 14, for example, balls which are guided on the guide body 73 in guides 74. The balls or drive angle fixing bodies 71 can be moved in the guides 74 along an adjustment path VB1 radially with respect to the axis of rotation D or the plug axis SA, so that they protrude once radially inward into a passage opening 75 of the guide body 73 to penetrate into a fixing receptacle 76 of the output angle fixing body 72 and fix it in place with respect to a linear adjustment along the angle positioning axis W, which corresponds to an angle fixing position V, see FIG. 4 in this regard. In contrast, in an angle adjustment position E, the balls or drive angle fixing bodies 71 are adjusted into the guide 74, but are disengaged from the fixing receptacle 76 of the output angle fixing body 72, so that it is linearly adjustable along the angle positioning axis W or also the plug axis SA.

The output angle fixing body 72 is formed by the rotation lock body 31. This is because the rotation lock body 31 has the rotation lock contours 33 on its end face, which are engaged or can be engaged in the angle fixing position V with the counter rotation lock contours 133, so that they are disengaged from the counter rotation lock contours 233. The linear adjustment of the rotation lock body 31 along the angle positioning axis W therefore ensures that the output part 15 is rotatable relative to the drive part 14, namely in that the rotation lock contours 33 are disengaged from the counter rotation lock contours 233, or the output part 15 is fastened for conjoint rotation with respect to the angle positioning axis W with respect to the drive part 14, namely in that the rotation lock contours 33 are engaged with the counter rotation lock contours 233 of the portable power tool 200.

The rotation lock body 31 or output angle fixing body 72 is displaceably mounted on the guide body 73 and the guide body 80 linearly with respect to the angle positioning axis W. Guide receptacles 81, which are located between guide projections 82, are provided on the guide body 80. The guide projections 82 engage in guide receptacles 84 on the rotation lock body 31 or output angle fixing body 72. Guide projections 83, which can also be referred to as rotation lock projections, and which engage in guide receptacles 81 of the guide body 80, are arranged between the guide receptacles 84. The guide projections 83 extend on the radial outer circumference with respect to the angle positioning axis W or the axis of rotation D1 of the rotation lock body 31 or output angle fixing body 72.

The screw receptacles 88 for the screws 88B, specifically using which the guide body 73 is fixedly connected to the guide body 80, are provided on the end faces of the guide projections 82 of the guide body 80.

The two guide bodies 80, 73 guide the output angle fixing body 72 or rotation lock body 31 linearly with respect to the angle positioning axis W.

It is possible in principle that, for example, to actuate the angle fixing bodies 71, a motorized actuator 71A, for example an electromagnet or the like is provided. However, a manual operating concept is provided in the present case, namely with the aid of an actuating device 90. The actuating device 90 comprises an actuating element 91, for example a ring, which has an actuating contour 92, in particular an inclined face, with which the balls or output angle fixing bodies 72 can be adjusted into the guides 74 and thus into engagement with the fixing receptacle 76 of the output angle fixing body 72, so that it is fixed in place with respect to the angle positioning axis W. The fixing receptacle 76 is designed, for example, as a ring groove on the outer circumference of the output angle fixing body 72, which is sleeve-shaped as a whole. It is to be mentioned here that the output angle fixing body 72 has a passage opening for the drive element 11, i.e., is penetrated by the drive element.

A handle element 93, for example, a ring body which is fixedly connected to or integral with the actuating element 91, is used for actuating the actuating element 71. Gripping contours 94, for example actuating tabs, ribs, or the like are arranged on the handle element 93, which are comfortably accessible to an operator on the radial outer circumference of the attachment 11. The guide body 80 preferably has recesses 85, in which the gripping contours 94 can engage. The recesses 85 form, for example, guide receptacles for guiding the handle element 93 in parallel to the angle positioning axis W, i.e., the actuating element 91 is adjusted in parallel to the angle positioning axis W by a linear adjustment of the handle element 93 to adjust the actuating contour 92 in parallel to the angle positioning axis W.

The actuating element 91 is spring-loaded with the aid of a spring assembly 97 in a position corresponding to the angle fixing position V. The spring assembly 97 comprises, for example, a coiled spring 98 which is accommodated in a spring receptacle 86B of the guide body 80 and in turn supports itself on the spring receptacle 86, for example on a bottom region, by which screws 89 are provided for fastening the guide body 80 the attachment housing 50. On the other hand, the spring 98 supports itself on a step 95 of the handle element 93 to load it in the direction of the angle fixing position V. The handle element 93 can be moved in a direction away from the support surface 32, i.e., toward the attachment housing 50, against the force of the spring 98 until it strikes against a stop 87 of the guide body 80. The stop 87 is located, for example, on the bottom region of the recess 85. It is preferred if the handle element 93 has multiple gripping contours 94 at angular intervals with respect to the angle positioning axis W, for example, two gripping contours 94 provided on opposite sides of the handle element 93.

It would now be possible that, for example, due to a corresponding rotation of the attachment 10 about the angle positioning axis W, the formfitting projections 34 slide along the edges of the formfitting receptacles 234, which are each designed as inclined faces, to thus disengage the rotation lock body 31 or output angle fixing body 72 from the counter locking contours 235.

However, an active actuation is preferably provided, namely with the aid of the actuating device 90.

The sequence is now as follows:

First, the actuating contour 92 is actuated in the direction of the angle adjustment position E of the angle fixing device 70, i.e., the balls or output angle fixing bodies 72 can enter the guides 74. Upon a further adjustment of the actuating element 91 into a position associated with the angle adjustment position E, i.e., in the direction of the stops 87, a driver body 79 provided on the radial circumference of the actuating element 91, for example a ring body or another driver contour of the actuating element 91, carries along the rotation lock body 31 or output angle fixing body 72 in the direction of the angle adjustment position E, namely in that the driver body 79 strikes against a driver projection 78, which protrudes radially outward from the rotation lock body 31. The driver projection 78 is designed, for example, as a flange production and protrudes radially outward in particular from the guide projections 83.

Due to this movement of the rotation lock body 31 or output angle fixing body 72 in the direction of the angle adjustment position E, the drive angle fixing bodies 71 or balls arrive in the region of release contours 72, for example ring-shaped sections on the outer circumference of the output angle fixing body 72, so that this and thus the output part 15 is rotatable in positioning axis W.

The angle fixing device 70 comprises drive angle fixing bodies 71 associated with the drive part 14, for example balls which are guided on the guide body 37 in guides 74. The guides 74 run radially with respect to the axis of rotation D and extend from the passage opening 75 of the guide body 73 to its radial outer circumference.

Figure 4:
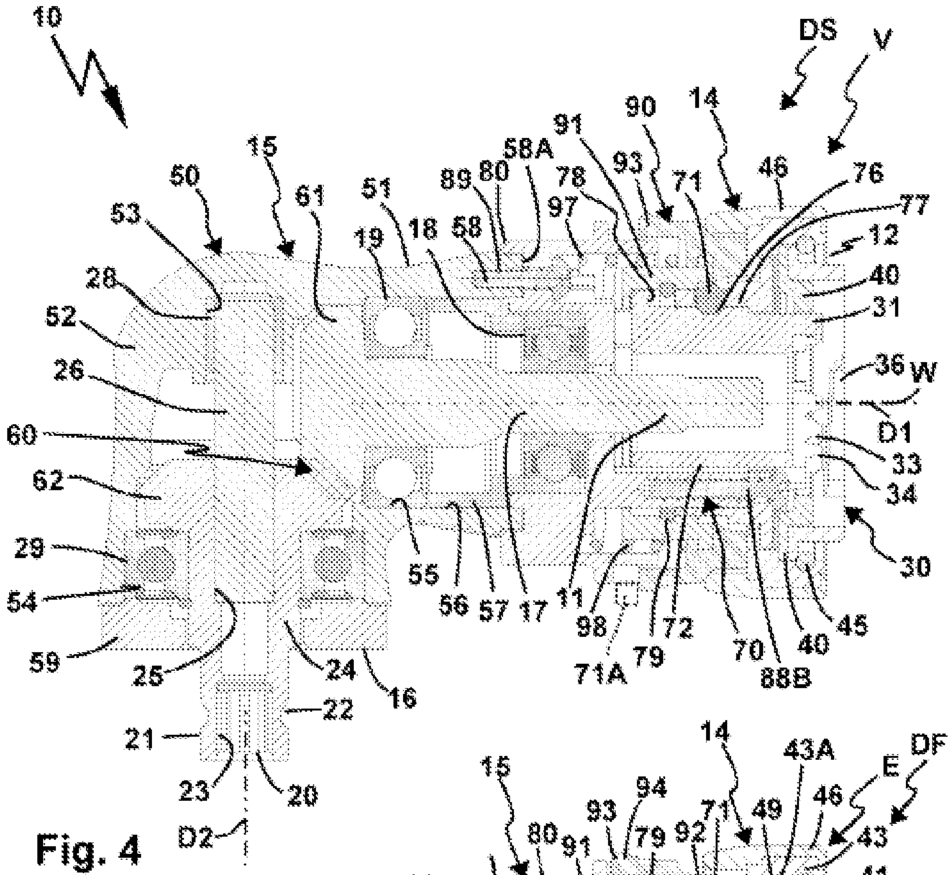
FIG. 4 shows a section through the attachment according to FIG. 2 along a section line A-A in FIG. 2 in an angle fixing position of its angle fixing device.
Figure 5:
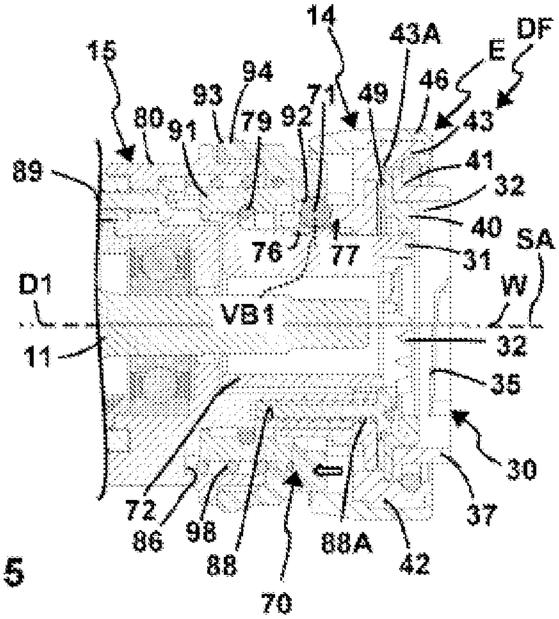
FIG. 5 shows a rear partial section of the attachment according to FIG. 4, wherein the angle fixing device is in its angle adjustment position.
Figure 6:
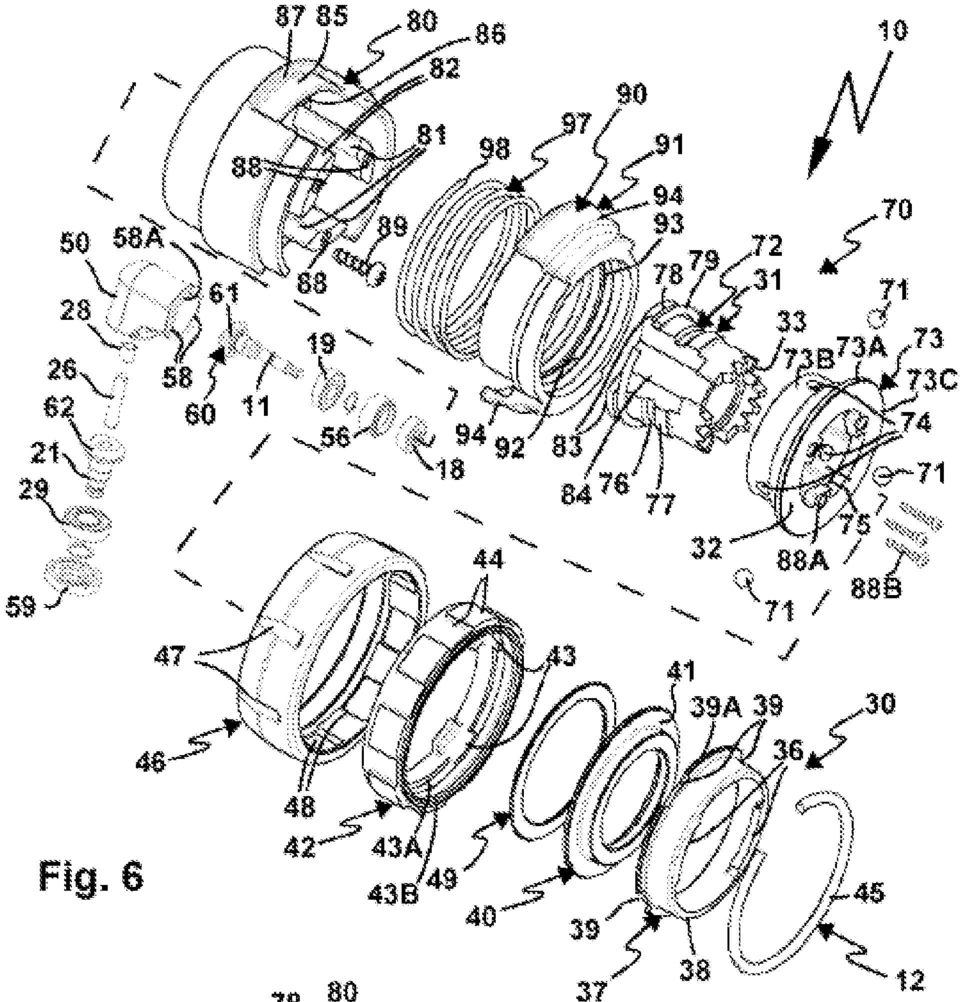
FIG. 6 shows an exploded illustration in a diagonal perspective of the attachment according to the above figures.
Figure 7:
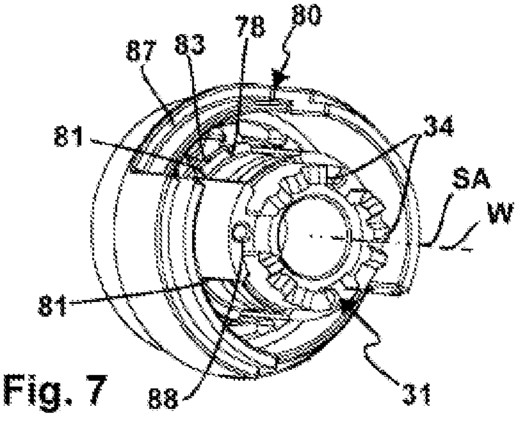
FIG. 7 shows a rotation lock body and a housing body of the attachment according to the above figures in diagonal perspective.
Figure 8:
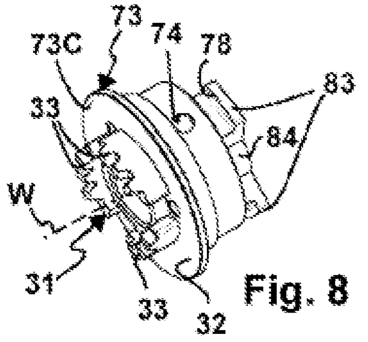
FIG. 8 shows the rotation lock body according to FIG. 7 in a lateral diagonal view.
Figure 9:
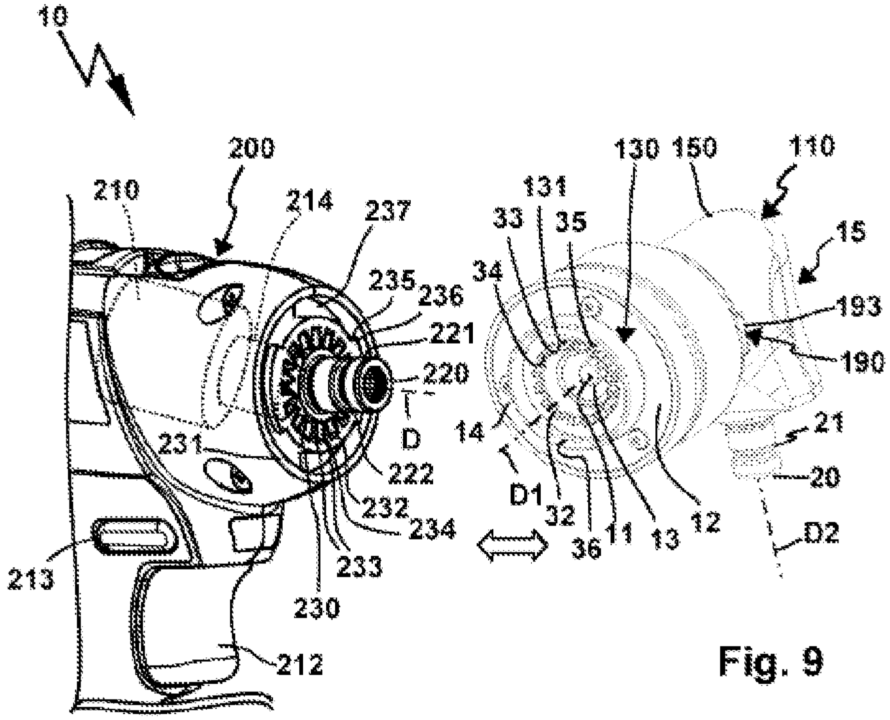
FIG. 9 shows a perspective diagonal view of a system consisting of a portable power tool and a further attachment.
Figure 10:
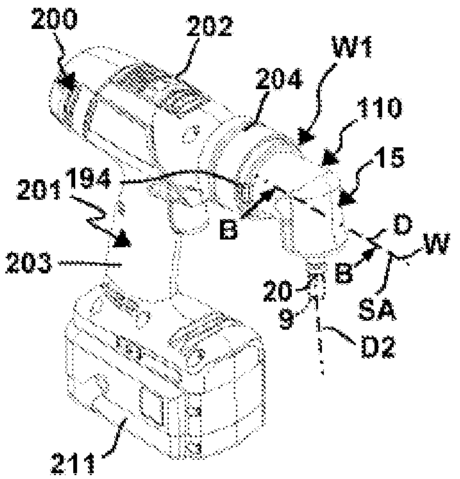
FIG. 10 shows the system according to FIG. 9, wherein the attachment is installed on the portable power tool and has a first angle position with respect to the angle positioning axis.
Figure 11:
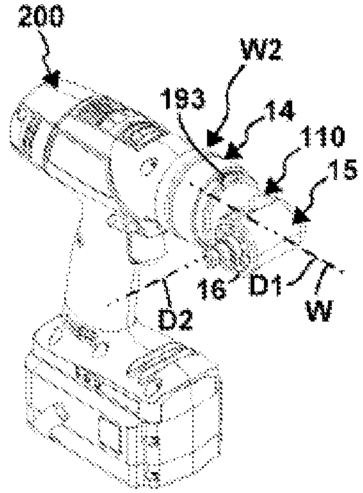
FIG. 11 shows the system according to FIG. 10, wherein the attachment assumes a second angle position.
Figure 12:
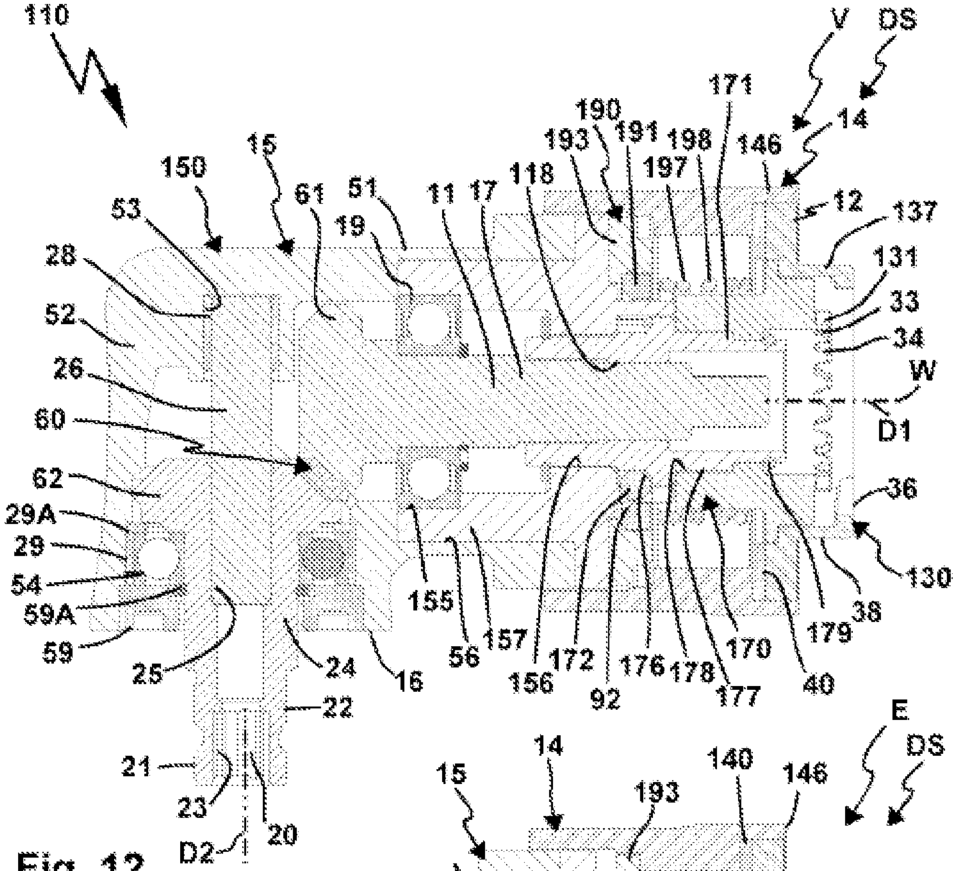
FIG. 12 shows a section through the attachment according to FIG. 10, approximately along a section line B-B in FIG. 10 in an angle fixing position of its angle fixing device.

The balls or drive angle fixing bodies 71 can be moved in the guides 74 radially with respect to the axis of rotation D or the plug axis SA, so that they protrude once radially inward into a passage opening 75 of the guide body 73, to penetrate into a fixing receptacle 76 of the output angle fixing body 72 and fix it in place with respect to a linear adjustment along the angle positioning axis W, which corresponds to an angle fixing position V, see FIG. 4 in this regard. In contrast, in an angle adjustment position E, the balls or drive angle fixing bodies 71 are adjusted into the guide 74, in any case are disengaged from the fixing receptacle 76 of the output angle fixing body 72, so that this is adjustable linearly along the angle positioning axis W or also the plug axis SA.

The output angle fixing body 72 is formed by the rotation lock body 31. This is because the rotation lock body 31 has the rotation lock contours 33 on its end face, which are engaged or can be engaged in the angle fixing position V with the counter rotation lock contours 133, so that they are disengaged from the counter rotation lock contours 233. The linear adjustment of the rotation lock body 31 along the angle positioning axis W thus ensures that the output part 15 is rotatable relative to the drive part 14, namely in that the rotation lock contours 33 are disengaged in a rotational release position DF from the counter rotation lock contours 233, or that the output part 15 is fixed for conjoint rotation with respect to the angle positioning axis W with respect to the drive part 14, namely in that the rotation lock contours 33 are engaged in a rotation lock position DS with the counter rotation lock contours 233 of the portable power tool 200.

The rotation lock body 31 or output angle fixing body 72 is displaceably mounted linearly with respect to the angle positioning axis W on the guide body 73 and the guide body 80. Guide receptacles 81, which are located between guide projections 82, are provided on the guide body 80. The guide projections 82 engage in guide receptacles 84 on the rotation lock body 31 or output angle fixing body 72. Guide projections 83, which can also be referred to as rotation lock projections, and which engage in guide receptacles 81 of the guide body 80, are arranged between the guide receptacles 84. The guide projections 83 extend on the radial outer circumference with respect to the angle positioning axis W or the axis of rotation D1 of the rotation lock body 31 or output angle fixing body 72.

The screw receptacles 88 for the screws 88B are provided on the end faces of the guide projections 82 of the guide body 80, with which the guide body 73 is specifically fixedly connected to the guide body 80. The two guide bodies 80, 73 thus guide the output angle fixing body 72 or rotation lock body 31 linearly with respect to the angle positioning axis W. It would be conceivable in principle, for example, that to actuate the angle fixing body 71, a motorized actuator, for example an electromagnet or the like is provided. However, a manual operating concept is provided in the present case, namely with the aid of an actuating device 90. The actuating device 90 comprises an actuating element 91, for example, a ring, which has an actuating contour 92, with which the balls or output angle fixing bodies 72 can be adjusted into the guides 74 and thus engaged with the fixing receptacle 76 of the output angle fixing body 72, so that this is fixed in place with respect to the angle positioning axis W. The fixing receptacle 76 is designed, for example, as a ring groove on the outer circumference of the output angle fixing body 72, which is sleeve-shaped as a whole.

The actuating contour 92 is or comprises, for example, an inclined face. The actuating contour 92 extends obliquely to the angle positioning axis W.

The output angle fixing body 72 has a passage opening for the drive element 11. The output angle fixing body 72 is penetrated by the drive element.

A handle element 93, for example a ring body, which is fixedly connected or integral with the actuating element 91, is used for actuating the actuating element 91. Gripping contours 94, for example, actuating tabs, ribs, or the like are arranged on the handle element 93, which are comfortably accessible to an operator on the radial outer circumference of the attachment 11.

The guide body 80 preferably has recesses 85 in which the gripping contours 94 can engage. The recesses 85 form, for example, guide receptacles for guiding the handle element 93 in parallel to the angle positioning axis W, i.e., due to a linear adjustment of the handle element 93, the actuating element 91 is adjusted in parallel to the angle positioning axis W, in order to adjust the actuating contour 92 in parallel to the angle positioning axis W.

The actuating element 91 is loaded with the aid of a spring assembly 97 in a position corresponding to the angle fixing position V. The spring assembly 97 comprises, for example, a coiled spring 98, which is accommodated in a spring receptacle 86B of the guide body 80 and in turn supports itself on the spring receptacle 86, for example on a bottom region, by which the screws 89 for fastening the guide body 80 to the attachment housing 50 are provided. On the other hand, the spring 98 supports itself on a step 95 of the handle element 93 to load this in the direction of the angle fixing position V. The handle element 93 can be moved in a direction away from the support surface 32, thus toward the attachment housing 50, against the force of the spring 98, until it strikes against a stop 87 of the guide body 80. The stop 87 is located, for example, on the bottom region of the recess 85. It is preferred if the handle element 93 has multiple gripping contours 94 at angular intervals with respect to the angle positioning axis W, for example, two gripping contours 94 provided on sides of the handle element 93 opposite to one another.

It would be possible that, for example, by a corresponding rotation of the attachment 10 about the angle positioning axis W, the formfitting projections 34 slide along the edges of the formfitting receptacles 234, which are each designed as inclined faces, to thus disengage the rotation lock body 31 or output angle fixing body 72 from the counter locking contours 235.

However, an active actuation is preferably provided, namely with the aid of the actuating device 90.

The sequence is now as follows:

First, the actuating contour 92 is actuated in the direction of the angle adjustment position E of the angle fixing device 70, i.e., the balls or output angle fixing bodies 72 can enter the guides 74. Upon a further adjustment of the actuating element 91 into a position associated with the angle adjustment position E, i.e., in the direction of the stops 87, a driver body 97 provided on the radial outer circumference of actuating element 91, for example, a ring body or another driver contour of the actuating element 91, carries along the rotation lock body 31 or output angle fixing body 72 in the direction of the angle adjustment position E, namely in that the driver body 79 strikes against a driver projection 78, which protrudes radially outward from the rotation lock body 31. The driver projection 78 is designed, for example, as a flange projection and in particular protrudes radially outward from the guide projections 83.

Due to this movement of the rotation lock body 31 or output angle fixing body 72 in the direction of the angle adjustment position E, the drive angle fixing bodies 71 or balls arrive in the region of release contours 72, for example, ring-shaped sections on the outer circumference of the output angle fixing body 72, so that this and thus the output part 15 is rotatable in positioning axis W.

In the angle adjustment position E, the support surfaces 32, 232 remain in contact with one another, i.e., the attachment 10 is supported along the plug axis SA on the portable power tool 200 and is connected in a tension-resistant manner with the audible power tool 200 with respect to the support axis or plug axis SA with the aid of the locking contours 35, 235 engage behind with one another with the portable power tool 200. The rotation lock with respect to the angle positioning axis W can thus be released by releasing the angle fixing device 70 or adjusting it from the angle fixing position V into the angle adjustment position E, without the fastening device 30 having to be transferred at the same time from its fastening position or fixing position into a release position. The output part 15 can be adjusted or rotated with respect to the drive part 15 about the angle positioning axis W without the fastening device 30 being released.

In the attachment 110, 310, a fastening device 130, 330 is provided for fastening on the portable power tool 200, which is functionally equivalent to the fastening device 30.

A latch body 137, 237 of the fastening device 130, 330 has a sleeve section 38, on the inner circumference of which locking contours 35, namely bayonet contours 36, are provided to engage behind the counter locking contours 235 or bayonet contours 236. Furthermore, the fastening device 30 comprises a support body 131, which has a support surface 32 for support on the support surface 232 of the portable power tool 200, and rotation lock contours 33, for example, formfitting projections 34 having formfitting receptacles between the respective formfitting projections 34. The rotation lock contours 33 are used to engage in the counter rotation lock contours 233 of the portable power tool 200, in which they engage in a rotation lock position DS. The attachment 110 can thus be plugged by a plug movement along a plug axis SA onto the portable power tool 200, wherein then the support surfaces 32, 232 are supported on one another and the rotation lock contours 33, 233 represent a rotation lock against a rotation about the plug axis SA, so that by rotating the latch body 137 about the plug axis SA, a tension-resistant fastening of the attachment 110 with respect to the plug axis SA on the portable power tool 200 is implemented, namely in that the locking contours 35, 235 engage behind one another.

The latch body 137, 337 is connected to a handle element 146, 346, which is provided for actuating the fastening device 130, 330 and is rotatably mounted on the attachment housing 150, 350.

The handle element 146, 346 has on its outer circumference, for example, a gripping contour 147, 347, which is grasped by an operator and is provided for actuating, namely for rotating the handle element 146, 346 and thus the latch body 137, 337 about the plug axis SA.

The attachment 110, 310 can be installed in different angle positions on the portable power tool 200 with respect to the plug axis SA, which also represents an angle positioning axis W. In this case, the gear teeth or rotation lock contours 33 engage in different angle positions in the counter rotation lock contours 233 and the fastening device 130, 330 is then accordingly fixed or locked or released or unlocked.

The following is provided in the attachment 110: even if the rotation lock contours 33, 233 remain engaged with one another, i.e., the attachment 110 remains in the locking position locked on the portable power tool 200 or the fastening position fastened on the portable power tool 200, in the attachment 110, an angle adjustment about the angle positioning axis W is possible, i.e., the output part 15, in particular the attachment housing 150, can be rotated in relation to the drive part 14 about the angle positioning axis W.

The handle element 146 has a step 143A, on which a support body 140 is supported, which in turn supports the ring body or latch body 137. Screws 145 are inserted through screw receptacles 139 of the latch body 137 and screw receptacles 142 of the support body 140 and screwed into screw receptacles 143 of the handle element 146. The screw receptacles 139 of the latch body 137 are provided on a flange section of the latch body 137, which supports itself on an end face or support face of the support body 140, which in turn supports itself on the step 143A.

The angle fixing device 170 comprises the drive angle fixing body 171, which is connected for conjoint rotation and in a displacement-fixed manner with respect to the angle positioning axis to the rotation lock body 131, and output angle fixing bodies 172, for example balls, which are mounted on the output part 15 radially with respect to the angle positioning axis W and are thus adjustable along adjustment paths VB2 radially with respect to the angle positioning axis W. If the output angle fixing bodies 172 are engaged with angle fixing receptacles 176 of the drive angle fixing body 171, the output part is locked or fixed for conjoint rotation with respect to the angle positioning axis W in relation to the drive part 14, i.e., the angle fixing device 170 assumes its angle fixing position V. In contrast, if the output angle fixing bodies 172 or balls are disengaged from the angle fixing receptacles 176 of the drive angle fixing body 171, the angle adjustment position E is assumed and the output part 15 can be pivoted relative to the drive part 14 about the angle positioning axis W.

The output angle fixing bodies 172 are movably mounted in guides 74, which run radially to the angle positioning axis W, of a guide body 173 between the angle fixing position V and the angle adjustment position E. In the angle fixing position V, the output angle fixing bodies 172 exit from the guides 74 and protrude into a passage opening 174, where they penetrate into angle fixing receptacles 176 of the drive angle fixing body 171 and fix, in particular lock this for conjoint rotation with respect to the guide body 73.

The guide body 173 is fixedly connected to the attachment housing 150. The guide body 173 is formed by the support body 157 or is fixedly connected thereto. For example, the support insert 157 or guide body 173 is inserted into the section 51 of the attachment housing 50, wherein rotation lock contours 58B on the inner circumference of the plug receptacle of the attachment housing 150 engage with rotation lock contours 158 on the radial outer circumference of the support insert 157 and hold it rotation locked with respect to the angle positioning axis W on the attachment housing 150.

A flange section 158B protrudes radially outward from the rotation lock contours 158, on which passage openings 158C for screws 89 are provided, which penetrate the passage openings 158C and are screwed into screw receptacles 58 on an end face 58A of the attachment housing 150.

The flange section or flange projection 158B of the support insert 157 or the guide body 173 supports itself on the end face 48A.

The drive angle fixing body 171 is connected to the rotation lock body 131 for conjoint rotation with respect to the angle positioning axis W and displacement-fixed in parallel to the angle positioning axis W. Rotation lock contours 177 are arranged on a sleeve section 177A, which engage with rotation lock contours 178 complementary thereto on the inner circumference of a receptacle of the rotation lock body 131, into which the drive angle fixing body 171 is inserted. A holding ring 179, for example a splint ring or the like, and supporting step contours on the rotation lock body 131 and the drive angle fixing body 171, which support themselves on one another and run transversely to the angle positioning axis W, also act in terms of a support and displacement-fixed holding of the drive angle fixing body 171 with respect to the rotation lock body 131. It would also be possible in principle that the rotation lock body 131 and the drive angle fixing body 171 are integral.

Figure 13:
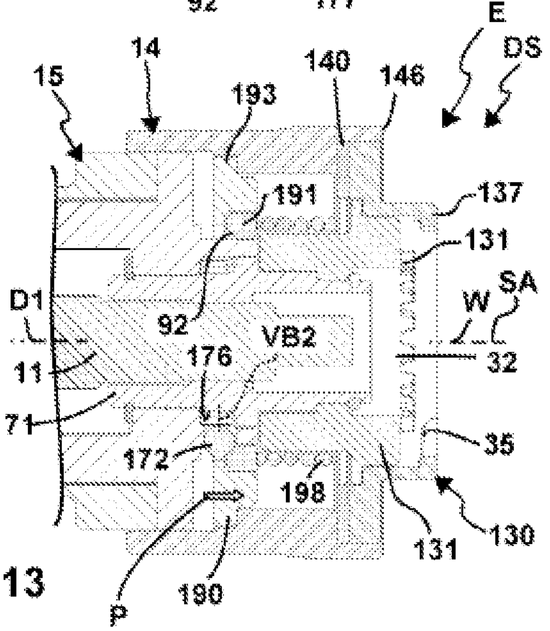
FIG. 13 shows a rear partial section of the attachment according to FIG. 12, wherein the angle fixing device is in its angle adjustment position.
Figure 14:
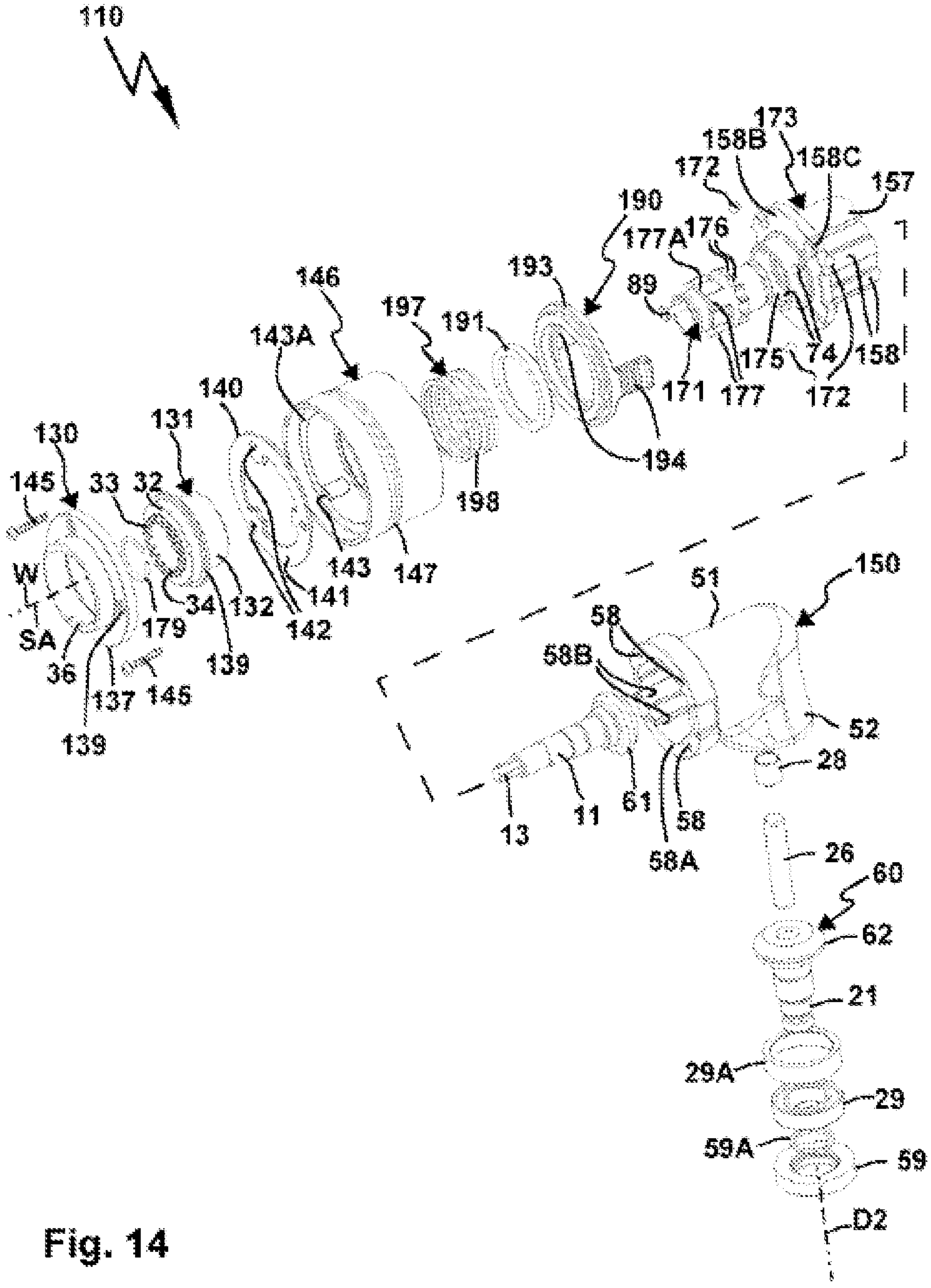
FIG. 14 shows an exploded illustration in a perspective diagonal view of the attachment according to FIGS. 9-13.
Figure 15:
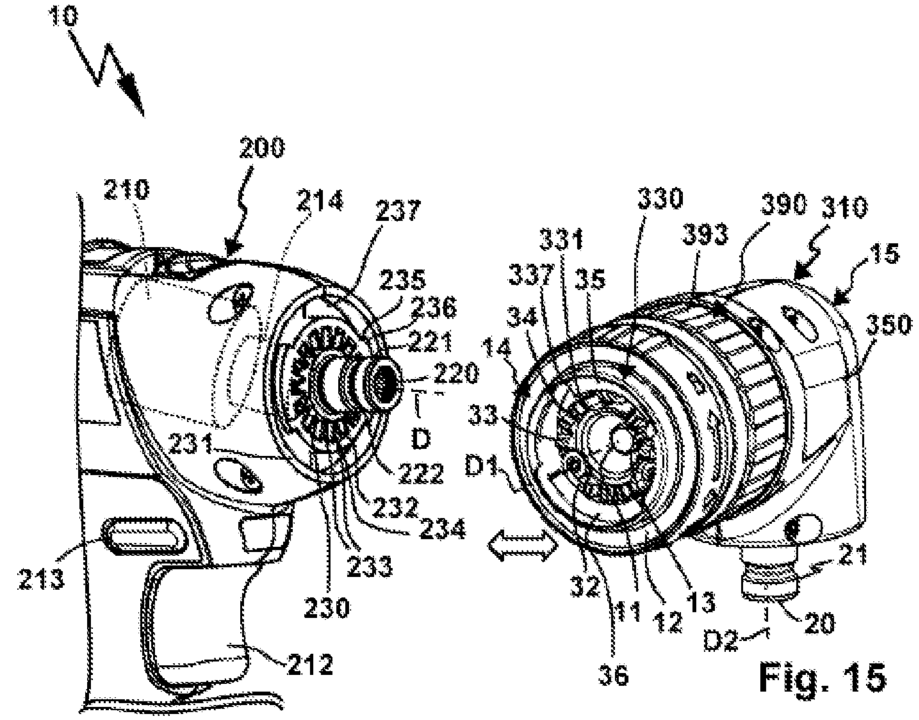
FIG. 15 shows a perspective diagonal view of a system consisting of a portable power tool and a further attachment.
Figure 16:
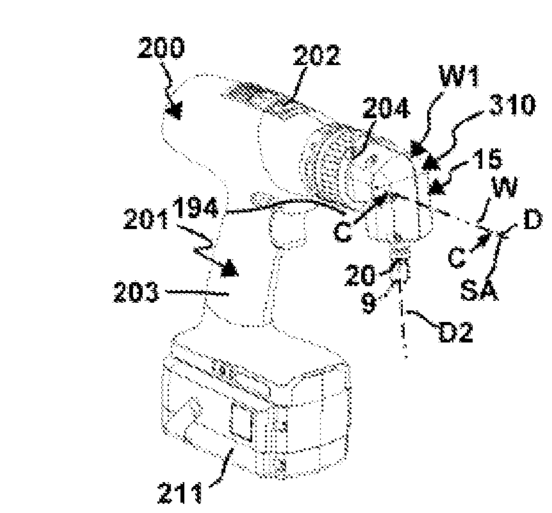
FIG. 16 shows the system according to FIG. 15, wherein the attachment is installed on the portable power tool and has a first angle position with respect to an angle positioning axis.
Figure 17:
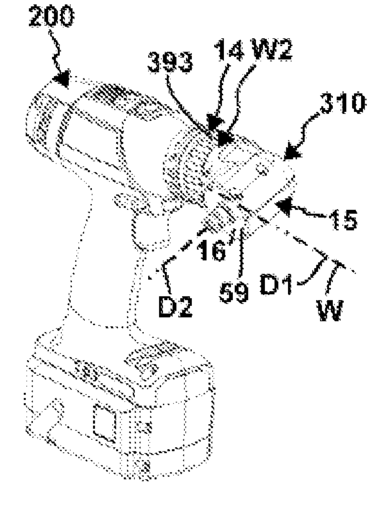
FIG. 17 shows the system according to FIG. 16, wherein the attachment assumes a second angle position.
Figure 18:
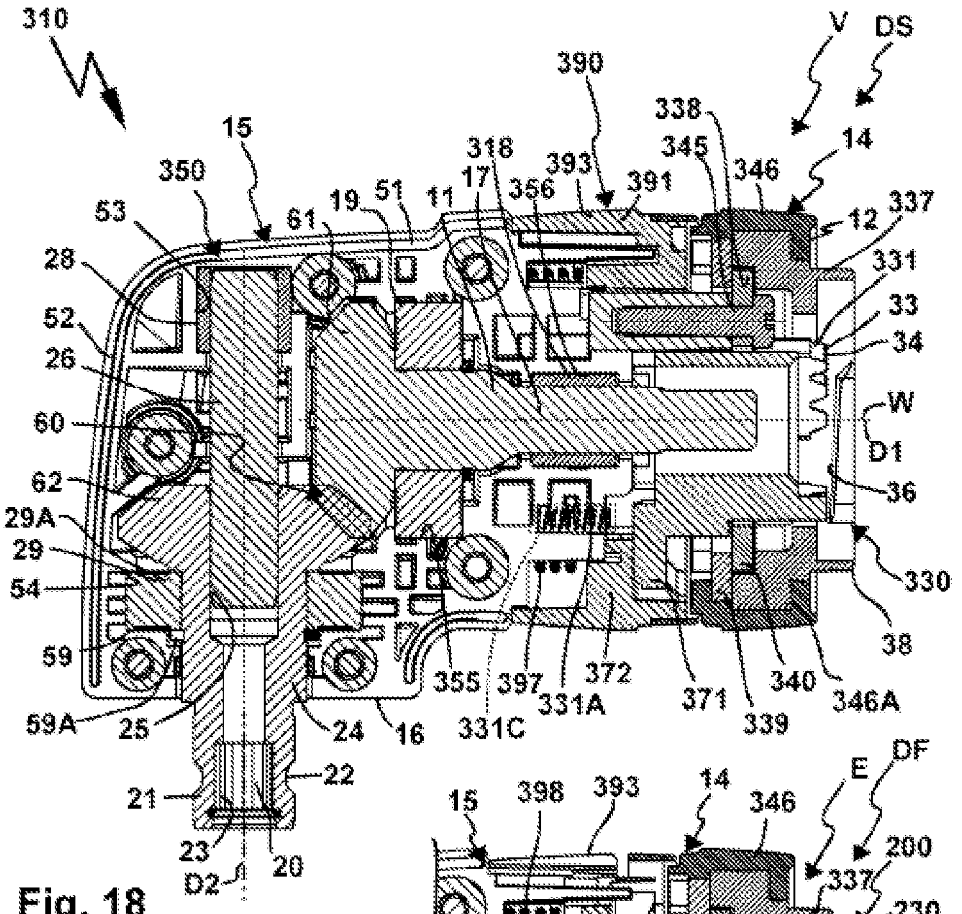
FIG. 18 shows a section through the attachment according to FIG. 16, approximately along a section line C-C in FIG. 16 in an angle fixing position of its angle fixing device.

The output angle fixing bodies 172 are actuatable with the aid of an actuating device 190. The actuating device 190 comprises an actuating body 191, for example a ring body, which has an actuating contour 92. The actuating contour 92 is an inclined face which extends obliquely to the angle positioning axis W and forms a component of an inclined face transmission or transfer transmission, using which the output angle fixing bodies 172 are actuatable out of their angle adjustment position E into the angle fixing position V. Due to an actuation in an arrow direction P in parallel to the angle positioning axis W (see FIG. 13), the actuating contour 92 releases the output angle fixing bodies 172 for an adjustment radially outward with respect to the angle positioning axis W, so that they can be disengaged from the angle fixing receptacles 176.

The actuating element 91 is loaded by a spring assembly 197 in the direction of the angle fixing position V, thus against the arrow direction of the arrow P. The spring assembly 197 has a spring 198, for example, a coiled spring, which supports itself on the rotation lock body 131, on the one hand, and on the actuating element 191, on the other hand.

For example, a sleeve section 132 of the rotation lock body 131 penetrates into the interior of the spring 198, which supports itself on the flange section 139 of the rotation lock body 131.

A handle element 193, for example a ring body, is provided for actuating the actuating element 191. The handle element 193 has, for example, gripping contours 194, in particular tabs or similar other protruding contours, which can be grasped by an operator to displace the handle element 193 and thus the actuating element 191 in parallel to the angle positioning axis W.

In the attachment 310, the actuating element 346 and the latch body 337 are fixedly connected to one another, for example, held on one another in a formfitting manner. For example, a radial and/or ring-shaped projection of the latch body 337 engages in a receptacle 346A of the actuating element 346 which is ring-shaped or open radially inward. A bearing receptacle 338 is provided on the latch body 337, in which a ring-shaped bearing body 340, which can also be referred to as a support body or bearing ring, engages. The bearing receptacle 338 is closed by a ring body 339, which is connected to the latch body 337, for example, is also accommodated in the receptacle 346A. The ring body 339 and the latch body 337 accommodate the bearing body 340 in a sandwich.

The bearing body 340, for example a ring, is connected with the aid of screws 345 to the housing 350. For example, the screws 345 are screwed into screw receptacles 358 on an end face 358A of a guide body 373. The guide body 373 is preferably formed by the housing 350 or is fixedly arranged thereon.

The latch body 337 is thus mounted rotatably on the attachment housing 350 about the axis of rotation D1 or angle positioning axis W or plug axis SA, so that by its rotation, the fastening device 30 is lockable or unlockable about this axis of rotation on the portable power tool 20. If an angle fixing device 370 assumes its angle fixing position V in this case, the rotation lock contours 33 of the attachment 310 enter formfitting, rotation-locked engagement with the rotation lock contours 32 of the portable power tool 200, so that the attachment 310 is held in a rotation-locked manner about the angle positioning axis W or axis of rotation D1 on the portable power tool 200.

The housing 350 is preferably in two parts and comprises housing parts 350A, 350B, which are joined on one another like half shells. For example, screws 350C are inserted through corresponding screw receptacles on the housing part 350B and screwed into screw domes or screw receptacles on the housing part 350A. The housing 350 houses the moving components of the attachment 310, for example, the transmission 60, the angle fixing device 370, and the like.

The angle fixing device 370 has a drive angle fixing body 371, which has the rotation lock contours 33, therefore the formfitting projections 34, on its side facing toward the drive side 12, so that it is supportable in a rotation-locked manner on the portable power tool 200 with respect to the angle positioning axis W. The drive angle fixing body 371 forms the rotation lock body 331 at the same time.

An output angle fixing body 372 is associated with output part 15, which is rotatably mounted about the angle positioning axis W or the axis of rotation D1 on the output part 15.

The rotation lock contours 33 engage in the angle fixing position E, which also represents a rotation lock position DS, in the counter rotation lock contours 233 of the portable power tool 200 and in the angle adjustment position E, which also represents the rotational release position DF, are disengaged from the counter rotation lock contours 233.

The guide body 373 is arranged on the section 51 of the attachment housing 50.

The guide body 373 penetrates an actuating element 391 of an actuating device 390 and protrudes with its end face 358A therefrom, so that it provides a bearing part for rotatably mounting the handle element 346 there, in particular for holding the bearing ring or bearing body 340, which is fastened on the guide body 373 and on which the handle element 346 is rotatably mounted.

The guide body 373 forms or preferably comprises a linear bearing 373A for the drive angle fixing body 371, which is displaceably mounted on the linear bearing 373A with respect to a positioning axis L. By adjusting the drive angle fixing body 371 along the positioning axis L, the rotation lock contours 33 can be engaged with or disengaged from the counter rotation lock contours 233, thus the angle fixing position V or the angle adjustment position E can be set.

The drive angle fixing body 371 or the rotation lock body 331, which is integral therewith or fixedly connected thereto, are loaded by a spring assembly 331A in the angle fixing position V. The spring assembly 331A comprises, for example, springs 331B, in particular coiled springs, which are supported on the output part 15. For example, the attachment housing 350, in particular its section 51, has spring receptacles 331C, in particular like pockets, in which the springs 331B are accommodated.

The springs 331B support the drive angle fixing body 371 on support contours 376. The support contours 376 are designed, for example, like projections protruding radially outward with respect to the angle positioning axis W. These projections protrude, for example, from a sleeve body 373B of the drive angle fixing body 371. For example, the rotation lock contours 373 are provided on an end face of the sleeve body 373B. The sleeve body 373B has a passage opening in which the drive element 11 engages.

The radial projections 377 form guide projections at the same time, which engage in guide receptacles 387 of the guide body 373 and are guided linearly there with respect to the axis L or angle positioning axis W. The support contours 376 or radial projections 377 thus form rotation lock contours at the same time, which hold the drive angle fixing body 371 for conjoint rotation with respect to the attachment housing 50 and/or the output part 15. Similarly, the angle fixing body 371 is mounted displaceably with respect to the linear axis L on the guide body 373. The spring assembly 373A loads the rotation lock body 331 or angle fixing body 371 in the direction of the angle fixing position V, in which the rotation lock contours 33 are engaged or become engaged with the counter rotation lock contours 233.

The actuating device 390 is thus more or less used to release the angle fixing position V, i.e., to adjust the angle fixing device 370 in the direction of the angle adjustment position E. Its actuating element 391 comprises an actuating ring 393, on the radial outer circumference of which a gripping contour 394 is arranged. The actuating ring 393 is rotatably mounted about the angle positioning axis W or the longitudinal axis L with respect to the drive part 14 and the output part 15 of the attachment 310, for example, rotatably mounted on the outer circumference of the guide body 373 to adjust the drive angle fixing body 372 with respect to the linear axis L.

The actuating element 391, thus the actuating ring 393, is integral with or fixedly connected to the output angle fixing body 372. For example, the output fixing body 372 is implemented as a component fixedly connected to the actuating element 91 or both components are integral.

The output angle fixing body 372 is thus rotatable about the angle positioning axis W and thus adjustable or rotatable with respect to the drive angle fixing body 371 about an arced, in particular ring-shaped or circular ring-shaped adjustment path VB3.

The actuating element 391 acts via a transfer transmission 400, for example, a transmission which redirects force and/or amplifies force, on angle fixing body 371. The transfer transmission 400 is an inclined face transmission or has an inclined face transmission, which acts on the support contours 376, in particular the radial projections 371, of the drive fixing body 371.

Support faces 401 are provided on the inner circumference of the actuating ring 393, which support the support contours 376 in the angle fixing position V, thus hold the rotation lock contours 33 engaged with the counter rotation lock contours 233. Adjacent to the support surfaces 401, which are preferably orthogonal to the angle positioning axis W, fixing positioning bevels 402 run, which merge into release support faces 403. The release support faces 403 are associated with the angle adjustment position E. Thus, if the actuating ring 393 and therefore the output angle fixing body 372 are rotated about the angle positioning axis W in a rotational direction DR or DL, the projections 372 or support contours 376 pass from the support faces 401 via the positioning bevels 402 to the support faces 403 and vice versa, wherein the angle fixing body 371 is adjusted between the angle fixing position V and the angle adjustment position E. Upon an adjustment from the angle adjustment position E in the direction of the angle fixing position V, the transfer transmission 400 acts in terms of a fixing transmission.

However, the actuating element 391 is also designed for adjusting the actuating device 390 from the angle fixing position V in the direction of the angle adjustment position E. The transfer transmission 400 thus forms a release transmission. This is because the projections 377 of the angle fixing body 371 support themselves on the release positioning bevels 404 opposite to the fixing positioning bevels and the release support faces 405 opposite to the release support faces 403. Guide channels 407 are defined between the respective above-mentioned faces, which are open to insertion openings 406 and are delimited at the ends by positive rotation stops 410, thus preferably represent quasi-cul-de-sacs. The projections 377 are insertable or inserted through the insertion openings 406 into the guide channels 407.

A spring assembly 397 loads the actuating element 391 in the direction of the angle fixing position V. The spring assembly 397 comprises, for example, a torsion spring 398, which is supported with a support end 398A on the attachment housing 50, for example the section 51, and with a support section 398B on the actuating element 391. The actuating element 391 is adjustable against the force of the spring assembly 397 out of a rotational position associated with the angle fixing position V into a rotational position associated with the angle adjustment position E, wherein the actuating element 391 having the angle fixing body 372 actuates the angle fixing body 371 out of the angle fixing position V in the direction of the angle adjustment position E.

The projections 377 thus strike on the positive rotation stops 410 in the angle adjustment position E. Due to further rotation of the actuating element 391 in the desired rotational direction DR or DL, the projections 377 strike on positive rotation contours 410R or 410L, which are arranged on opposite sides of the positive rotation stops 410, so that they carry along the angle fixing body 371 in the rotational direction DR or DL. This is in turn displaceable with respect to the longitudinal axis L, but supported for conjoint rotation with respect thereto and also in particular for conjoint rotation with respect to the angle positioning axis W on the output part 15, so that a rotation of the actuating element 391 in the rotational direction DR or DL correspondingly positively rotates the output part 15. An operating action is thus extremely simple, namely in that the operator first releases the angle fixing by actuating the actuating element 391, thus adjusts the angle fixing device 370 into the angle adjustment position E, and rotates the drive part 15 about the angle positioning axis W with respect to the drive part 12 by subsequent, in particular continuous further rotation of the actuating element 391. The actuating device 390 has this operating function in both rotational directions DR and DL.

A subsequent angle fixation of the output part 15 with respect to the drive part 14 and thus with respect to the portable power tool 10 is achieved particularly simply, namely in that the operator releases the actuating element 91, so that it is loaded by the spring assembly 397 in its position associated with the angle fixing position V, thus acts in terms of an angle fixation. If the rotation lock contours 33, 233 are now in a rotational position matching one another with respect to the angle positioning axis W, the spring assemblies 331A and 397 act in terms of latching and locking for conjoint rotation of the output part 15 with respect to the drive part 14. The drive part 15 thus more or less locks in the desired rotational position.

Figure 19:
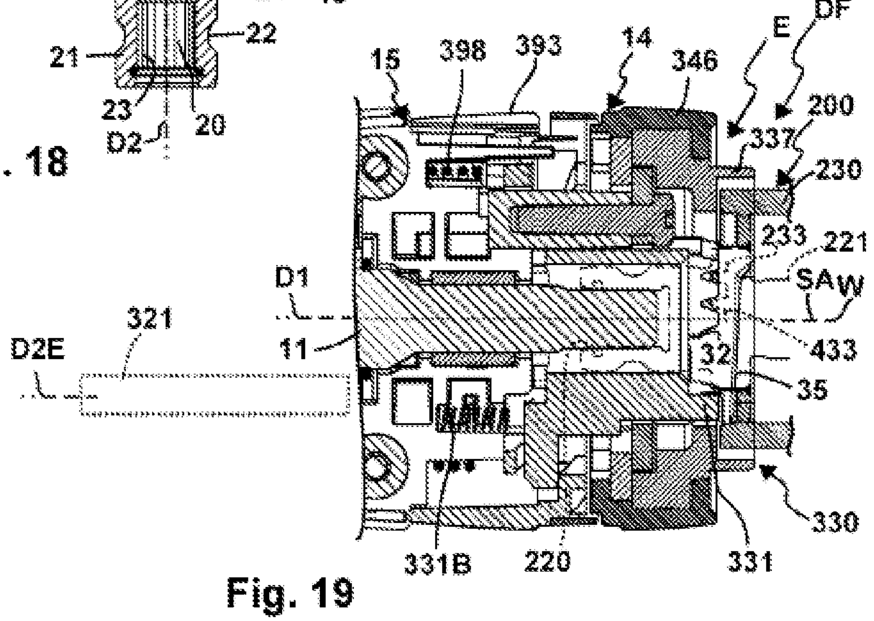
FIG. 19 shows a rear partial section of the attachment according to FIG. 18, wherein the angle fixing device is in its angle adjustment position.
Figure 20:
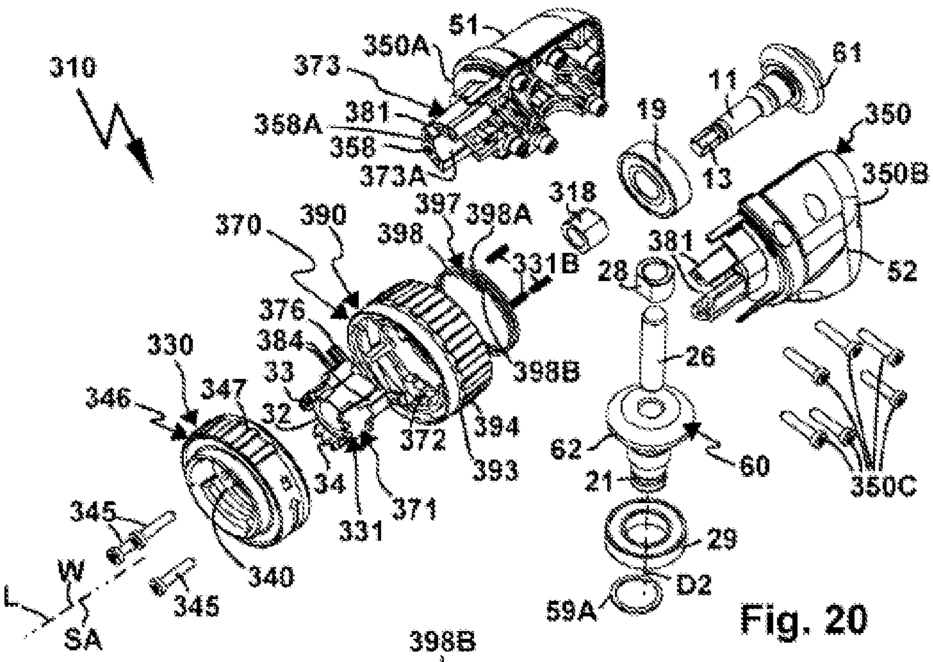
FIG. 20 shows an exploded illustration in a perspective diagonal view according to FIGS. 15 to 19.
Figure 21:
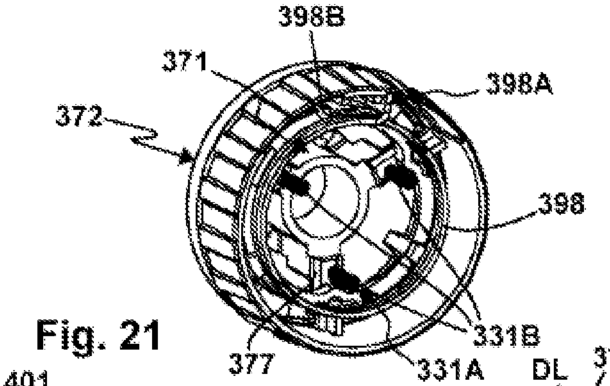
FIG. 21 shows a perspective diagonal view of angle fixing bodies of the angle fixing device of the attachment according to FIGS. 15 to 20.
Figure 22:
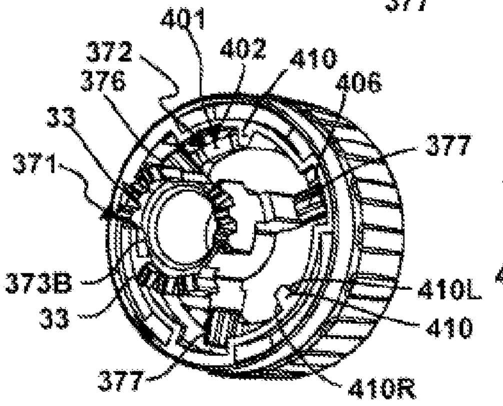
FIG. 22 shows a perspective diagonal view of the assembly according to FIG. 21, but from an opposite side.
Figure 23:
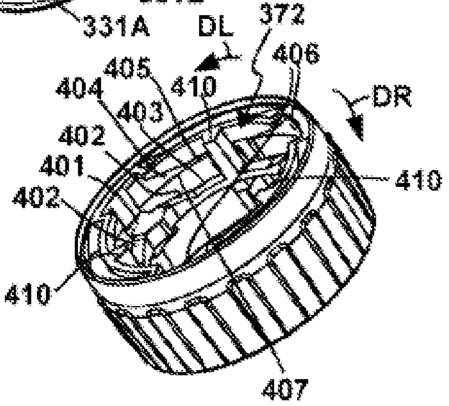
FIG. 23 shows a perspective diagonal view of an angle fixing body of the angle fixing device according to FIGS. 21 and 22, seen approximately from the same side as in FIG. 22.

FIG. 19 schematically shows an eccentric attachment, the output element 321 of which is rotatably mounted about an axis of rotation D2E. The axes of rotation D1 and D2 are parallel to one another, for example, but have an offset transverse to the longitudinal direction thereof in relation to one another. The axis of rotation D2E is rotatable about the angle positioning axis W with respect to the axis of rotation D1, for example, but always extends in parallel thereto.

The drive angle fixing bodies 71, 171, 371 are fixedly connected to the rotation lock bodies 31, 131, 331 or are integral therewith. They can thus be brought with the machine-side counter rotation lock contours 233 into rotation-locked engagement with respect to the angle positioning axis W. However, a quasi-internal rotation lock within the respective attachment 10, 110, 310 would also be readily possible. Thus, for example, if the angle fixing bodies 71, 171, 371 with their rotation lock contours 33 are engaged with or disengaged from counter rotation lock contours, which are fixed in place with respect to the drive part 14 but are fastened for conjoint rotation with respect to the angle positioning axis W, like the counter rotation lock contours 233, the above-mentioned concepts are readily also implementable. One could thus imagine, for example, that fixed counter rotation lock contours, schematically shown by the reference sign 433, like the counter rotation lock contours 233, are arranged, for example, in the region of the fastening devices 30, 130, 330.

The invention claimed is:

1. An attachment for a portable power tool, wherein the attachment has a drive part with a drive element and an output part with an output element for driving a work tool, wherein the drive element can be coupled to a machine output element of the portable power tool to drive the attachment and is connected or coupled to the output element via a transmission for driving the output element, and wherein the drive part has, on a drive side, a fastening device for releasably fastening the attachment for conjoint rotation with respect to an angle positioning axis on the portable power tool, and wherein the output part is rotatable about the angle positioning axis relative to the drive part into at least two mutually different angle positions and each angle position is fixable by way of an angle fixing device that has a drive angle fixing body and an output angle fixing body, wherein at least one of the angle fixing bodies is adjustable along an adjustment path relative to the other angle fixing body by an actuating element of an actuating device of the attachment between an angle fixing position, in which the angle fixing bodies fix the output part with respect to the drive part for conjoint rotation, and an angle adjustment position, in which the angle fixing bodies release the output part for rotation about the angle positioning axis with respect to the drive part.

2. The attachment as claimed in claim 1, wherein the angle fixing bodies are in formfitting engagement with one another in the angle fixing position and/or the angle fixing bodies are disengaged in the angle adjustment position.

3. The attachment as claimed in claim 1, wherein the drive angle fixing body is arranged for conjoint rotation with respect to the angle positioning axis on the drive part and/or is associated with the drive part and/or wherein the output angle fixing body is arranged for conjoint rotation with respect to the angle positioning axis on the output part and/or is associated with the output part.

4. The attachment as claimed in claim 1, wherein the adjustment path runs transversely to the angle positioning axis and/or radially with respect to the angle positioning axis and/or in an arched shape about the angle positioning axis.

5. The attachment as claimed in claim 1, wherein the fastening device and/or the angle fixing device has, on the drive side for rotation-locked holding of the attachment with respect to the angle positioning axis, rotation lock contours arranged on the portable power tool, to engage in counter rotation lock contours of the portable power tool or the drive part of the attachment.

6. The attachment as claimed in claim 5, wherein the rotation lock contours can be engaged with the counter rotation lock contours by a plugging movement in a plug direction along a plug axis, which is parallel to the angle positioning axis or has a directional component parallel to the angle positioning axis.

7. The attachment as claimed in claim 1, wherein the fastening device has a support surface for support on the portable power tool in a plug direction along a plug axis and a latch body, which is adjustable at least between a fixing position and a release position, having at least one locking contour for a tension-resistant holding of the attachment on the portable power tool against the plug direction, which latch body is engaged in the fixing position with a counter locking contour of the portable power tool and in the release position is disengaged from the counter locking contour to remove the attachment from the portable power tool.

8. The attachment as claimed in claim 7, wherein the latch body is a ring body rotatably mounted about the plug axis or angle positioning axis and/or the locking contour is a bayonet contour and/or the latch body is rotatably mounted about an axis of rotation, along which the plug direction runs.

9. The attachment as claimed in claim 5, wherein the drive angle fixing body and the rotation lock body are connected fixedly and/or for conjoint rotation and/or displacement-fixed or are integral and/or the drive angle fixing body forms the rotation lock body and/or the rotation lock contours are on the drive angle fixing body.

10. The attachment as claimed in claim 5, wherein the rotation lock body and/or the drive angle fixing body is mounted on the attachment movably with respect to the angle positioning axis between a rotation lock position and a rotational release position, wherein the rotation lock contours are adjusted in the rotation lock position toward the counter rotation lock contours and are adjusted in the rotational release position away from the counter rotation lock contours, and/or the rotation lock contours protrude further from the drive side to engage in the counter rotation lock contours of the portable power tool in the rotation lock position than in the rotational release position.

11. The attachment as claimed in claim 5, wherein the output angle fixing bodies, in the angle fixing position of the angle fixing device, fix the rotation lock body in place in the rotation lock position and/or, in the angle adjustment position release the rotation lock body for a movement into the rotational release position.

12. The attachment as claimed in claim 5, wherein the actuating element is movement coupled to the rotation lock body to carry it along into the rotational release position, and/or wherein a release transmission, is arranged between the actuating element and the rotation lock body to adjust the rotation lock body from the rotation lock position into the rotational release position.

13. The attachment as claimed in claim 5, wherein a clearance is provided between the actuating element and the at least one adjustable rotation lock body, which clearance enables an adjustment of the at least one angle fixing body adjustable along the adjustment path from the angle fixing position into the angle adjustment position before an adjustment of the rotation lock body from the rotation lock position into the rotational release position.

14. The attachment as claimed in claim 5, wherein the rotation lock body is spring-loaded by a spring assembly in the rotation lock position.

15. The attachment as claimed in claim 1, further comprising a spring assembly for actuating the angle fixing device in the angle fixing position.

16. The attachment as claimed in claim 15, wherein the spring assembly acts on the actuating element of the actuating device in terms of an adjustment of the angle fixing device into the angle fixing position, and/or the spring assembly comprises a coiled spring or torsion spring penetrated by the angle positioning axis.

17. The attachment as claimed in claim 1, wherein the actuating device, is manually actuatable and/or extends in a ring shape or partial ring shape about the angle positioning axis and/or comprises an actuating ring.

18. The attachment as claimed in claim 1, wherein a transfer transmission is arranged between the actuating element and the angle fixing body to be actuated by the actuating element for force redirection of a movement of the actuating element in a first movement direction and into a movement of the angle fixing body to be actuated in a second movement direction.

19. The attachment as claimed in claim 1, wherein the actuating element is movably mounted on the attachment transversely, to the angle fixing body to be actuated and/or linearly and/or in parallel to the angle positioning axis and/or rotatably about the angle positioning axis.

20. The attachment as claimed in claim 1, wherein the actuating element is rotatably mounted about the angle positioning axis and has at least one positive rotation contour for positive rotation of the output part about the angle positioning axis.

21. The attachment as claimed in claim 20, wherein the actuating element has a rotational clearance for a rotational movement about the angle positioning axis with respect to the output part in such a way that the actuating element is rotatable out of a rotational position associated with the angle fixing position into a rotational position associated with the angle adjustment position, before the at least one positive rotation contour enters into rotational engagement with the output part.

22. The attachment as claimed in claim 1, wherein the actuating element is fixedly connected or integral with at least one angle fixing body.

23. The attachment as claimed in claim 1, wherein one angle fixing body is arranged radially outward with respect to the other angle fixing body.

24. The attachment as claimed in claim 1, wherein at least one of the angle fixing bodies, is designed as a sleeve body or is formed by a sleeve body and/or is penetrated by a drive element of the attachment.

25. The attachment as claimed in claim 1, wherein at least one of the angle fixing bodies, is or comprises a locking cone and/or at least one of the angle fixing bodies, has a spherical cap for accommodating the radially movable angle fixing body.

26. The attachment as claimed in claim 1, wherein the at least one angle fixing body adjustable along the adjustment path and movable radially to the angle positioning axis forms a component of an assembly of at least two, angle fixing bodies actuatable by the actuating device and arranged in a ring shape about the angle positioning axis, which have angular intervals in relation to one another with respect to the angle positioning axis and are movably mounted along the adjustment path.

27. The attachment as claimed in claim 1, wherein the output angle fixing body is fixed in place radially with respect to the angle positioning axis and/or is displaceably mounted in parallel to the angle positioning axis with respect to the drive part, and the drive angle fixing body comprises the at least one angle fixing body movably mounted along the adjustment path or is formed thereby.

28. A portable power tool having an attachment as claimed in claim 1.

* * * * *